United States Patent
Chung et al.

(10) Patent No.: US 11,899,845 B2
(45) Date of Patent: Feb. 13, 2024

(54) ELECTRONIC DEVICE FOR RECOGNIZING GESTURE AND METHOD FOR OPERATING THE SAME

(71) Applicant: Samsung Electronics Co., Ltd., Suwon-si (KR)

(72) Inventors: Wonsuk Chung, Suwon-si (KR); Yongsang Cho, Suwon-si (KR); Byungwook Yoo, Suwon-si (KR); Sungjin Park, Suwon-si (KR); Chaiman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/428,438

(22) PCT Filed: Aug. 3, 2021

(86) PCT No.: PCT/KR2021/010173
§ 371 (c)(1),
(2) Date: Aug. 4, 2021

(87) PCT Pub. No.: WO2022/030968
PCT Pub. Date: Feb. 10, 2022

(65) Prior Publication Data
US 2022/0326779 A1    Oct. 13, 2022

(30) Foreign Application Priority Data

Aug. 4, 2020 (KR) .................. 10-2020-0097190
Sep. 25, 2020 (KR) .................. 10-2020-0125201

(51) Int. Cl.
*G06F 3/01*   (2006.01)
*G06F 3/03*   (2006.01)
(Continued)

(52) U.S. Cl.
CPC ............. *G06F 3/017* (2013.01); *G06F 3/03* (2013.01); *G06F 3/0346* (2013.01); *G06F 18/00* (2023.01);
(Continued)

(58) Field of Classification Search
CPC ... G06F 3/01; G06F 3/03; G06F 3/014; G06F 3/015; G06F 1/16; G06F 3/0346;
(Continued)

(56) References Cited

U.S. PATENT DOCUMENTS 6,573,883 B1 * 6/2003 Bartlett .................. G06F 3/017
345/157
10,114,462 B2 * 10/2018 Züger .................... G06F 3/016
(Continued)

FOREIGN PATENT DOCUMENTS

JP       2004-157994 A    6/2004
KR   10-2011-0093488 A    8/2011
(Continued)

OTHER PUBLICATIONS

International Search report and Written Opinion dated Oct. 25, 2021, issued in International Patent Application No. PCT/KR2021/010173.

*Primary Examiner* — Mihir K Rayan
(74) *Attorney, Agent, or Firm* — Jefferson IP Law, LLP

(57) ABSTRACT

An electronic device is provided. The electronic device includes at least one sensor and at least one processor configured to identify a gesture identification request from a first application being executed by the at least one processor, in response to the identification of the gesture identification request, identify a gesture using at least one sensing data from at least one first sensor module activated, among the at least one sensor, based on a gesture application, provide the identified gesture to the first application, and perform at least
(Continued)

one operation corresponding to the identified gesture based on the first application. Other various embodiments are possible as well.

15 Claims, 27 Drawing Sheets

(51) Int. Cl.
*G06F 3/0346* (2013.01)
*G04G 21/00* (2010.01)
*G06F 18/00* (2023.01)
*H04M 1/72409* (2021.01)
*G04G 21/02* (2010.01)
*G06V 40/20* (2022.01)

(52) U.S. Cl.
CPC ............. *G04G 21/00* (2013.01); *G04G 21/02* (2013.01); *G06F 2218/10* (2023.01); *G06V 40/20* (2022.01); *H04M 1/724095* (2022.02)

(58) Field of Classification Search
CPC . G06F 3/14; G06F 3/017; G06F 18/00; G06F 2218/10; G06F 2218/12; G06K 9/62; G04G 21/02; G04G 9/0064; G04G 9/007; G04G 21/00; H04M 1/724095; H04M 1/72469; H04M 1/72454; Y02D 30/70; G06V 40/20

See application file for complete search history.

(56) References Cited

U.S. PATENT DOCUMENTS

| | | | |
|---|---|---|---|
| 11,119,580 B2* | 9/2021 | Li | G06F 1/163 |
| 11,389,084 B2* | 7/2022 | Zhang | G06F 1/163 |
| 2004/0068409 A1 | 4/2004 | Tanaka et al. | |
| 2011/0018731 A1 | 1/2011 | Linsky et al. | |
| 2011/0202878 A1 | 8/2011 | Park et al. | |
| 2012/0254878 A1* | 10/2012 | Nachman | G06F 1/3293 718/102 |
| 2013/0002538 A1* | 1/2013 | Mooring | G06F 1/163 345/156 |
| 2015/0324004 A1* | 11/2015 | Lee | G06F 3/017 345/156 |
| 2017/0147077 A1 | 5/2017 | Park et al. | |
| 2018/0129284 A1 | 5/2018 | Davis et al. | |
| 2019/0104340 A1* | 4/2019 | Liu | H04N 21/42204 |

FOREIGN PATENT DOCUMENTS

| KR | 10-2012-0045528 A | 5/2012 |
|---|---|---|
| KR | 10-2012-0047970 A | 5/2012 |

* cited by examiner (a)

(b)

ical Solution
ELECTRONIC DEVICE FOR RECOGNIZING GESTURE AND METHOD FOR OPERATING THE SAME

CROSS-REFERENCE TO RELATED APPLICATION(S)

This application is a U.S. National Stage application under 35 U.S.C. § 371 of an International application number PCT/KR2021/010173, filed on Aug. 3, 2021, which is based on and claims priority of a Korean patent application number 10-2020-0097190, filed on Aug. 4, 2020, in the Korean Intellectual Property Office, and of a Korean patent application number 10-2020-0125201, filed on Sep. 25, 2020, in the Korean Intellectual Property Office, the disclosure of each of which is incorporated by reference herein in its entirety.

TECHNICAL FIELD

The disclosure relates to an electronic device for recognizing a gesture and a method for operating the same.

BACKGROUND ART

Portable electronic devices, such as smart phones, tablet personal computers (PCs), and wearable devices are recently in wide use, and the growth of technology is leading to advanced techniques for measuring biometric signals. An electronic device may identify its motion information via a sensor (e.g., a biometric sensor or a motion sensor). The electronic device may recognize the user's gesture based on at least one of a biometric signal or motion information.

The electronic device may identify the motion of the body part of the user wearing the electronic device, using the motion information. For example, the electronic device may identify information for the motion of the user's arm. The electronic device may identify information for the relaxation/contraction of the user's muscle using a biometric signal. The electronic device may identify a change in the shape of the user's hand based on the biometric signal indicating the relaxation/contraction of the user's muscle when the user closes, or closes and opens, her hand.

Upon identifying a gesture, the electronic device may perform an operation corresponding to the gesture. As such, the user may make a gesture, with the electronic device worn, and may thus control the electronic device as she desires.

The above information is presented as background information only to assist with an understanding of the disclosure. No determination has been made, and no assertion is made, as to whether any of the above might be applicable as prior art with regard to the disclosure.

DISCLOSURE

Technical Problem

The user may make a gesture at an arbitrary time. In such a case, the electronic device may be required to perform gesture recognition all the time. For example, the electronic device leaves relevant sensors always on so as to obtain sensing signals required for gesture recognition, causing power waste. The electronic device may process sensing signals obtained from the sensors and constantly perform gesture recognition based on the result of processing. This way may result in significant resource consumption.

Gesture recognition may require segmentation of a proper sensing signal. For example, when the user walks or runs or even makes a slight arm motion, with the electronic device worn, the electronic device may recognize such motion. The electronic device may be required to simultaneously segment corresponding signals and perform gesture recognition. Conventional schemes include a first scheme that recognizes only large motions or a second scheme that uses the peak-to-peak of the signal waveform during a relatively long period of time. The first scheme fails to recognize relatively small motions, and the second scheme takes long in recognizing a gesture.

Aspects of the disclosure are to address at least the above-mentioned problems and/or disadvantages and to provide at least the advantages described below. Accordingly, an aspect of the disclosure is to provide an electronic device and method for operating the same that may recognize a gesture via a sensor when there is a gesture recognition request from a specific application.

Another aspect of the disclosure is to provide an electronic device and method for operating the same that may determine whether to segment corresponding signals using the sum of sensed signals during a predetermined period of time.

Additional aspects will be set forth in part in the description which follows and, in part, will be apparent from the description, or may be learned by practice of the presented embodiments.

Technical Solution

In accordance with an aspect of the disclosure an electronic device is provided. The electronic device includes at least one sensor and at least one processor configured to identify a gesture identification request from a first application being executed by the at least one processor, in response to the identification of the gesture identification request, identify a gesture using at least one sensing data from at least one first sensor module activated, among the at least one sensor, based on a gesture application, provide the identified gesture to the first application, and perform at least one operation corresponding to the identified gesture based on the first application.

In accordance with another aspect of the disclosure, a method for operating an electronic device is provided. The method includes identifying a gesture identification request from a first application being executed by at least one processor of the electronic device, in response to the identification of the gesture identification request, identifying a gesture using at least one sensing data from at least one first sensor module activated, among the at least one sensor of the electronic device, based on a gesture application, providing the identified gesture to the first application, and performing at least one operation corresponding to the identified gesture based on the first application.

Advantageous Effects

In accordance with another aspect of the disclosure an electronic device and method for operating the same is provided. The electronic device and method may recognize a gesture by executing a gesture application when there is a gesture recognition request from a specific application. This eliminates the need for the sensor to stay on and for the gesture recognition process to keep on running, thus reducing power consumption and resource waste.

In accordance with another aspect of the disclosure an electronic device and method for operating the same is provided. The electronic device and method may determine whether to segment corresponding signals using the sum of sensed signals during a predetermined period of time. Thus, it is possible to immediately recognize relatively small gestures.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
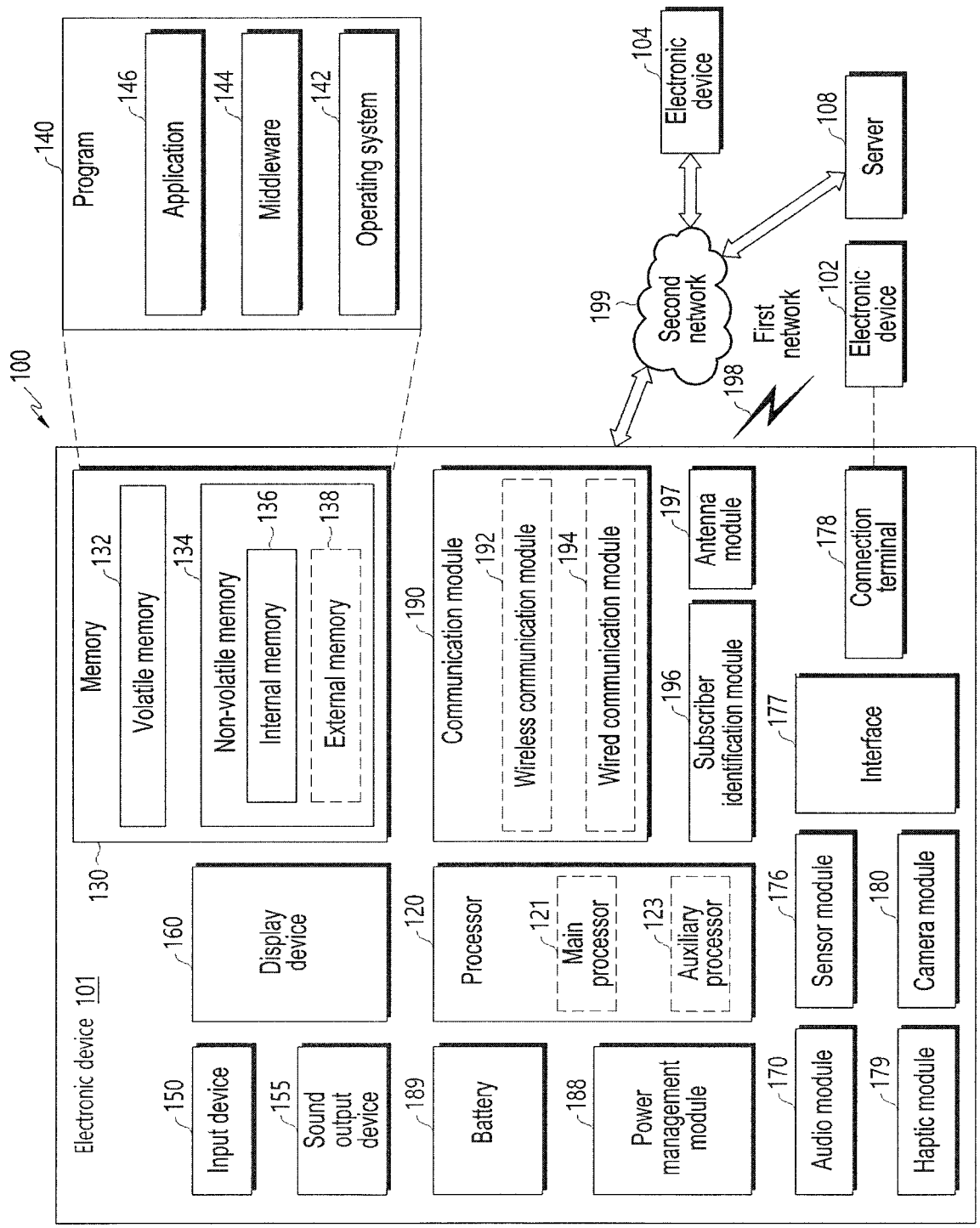
FIG. 1 is a block diagram illustrating an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 1301. According to an embodiment, some (e.g., the sensor module 176, the camera module 180, or the antenna module 197) of the components may be integrated into a single component (e.g., the display module 160).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain a sound through the input module 150 or output a sound through the sound output module 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
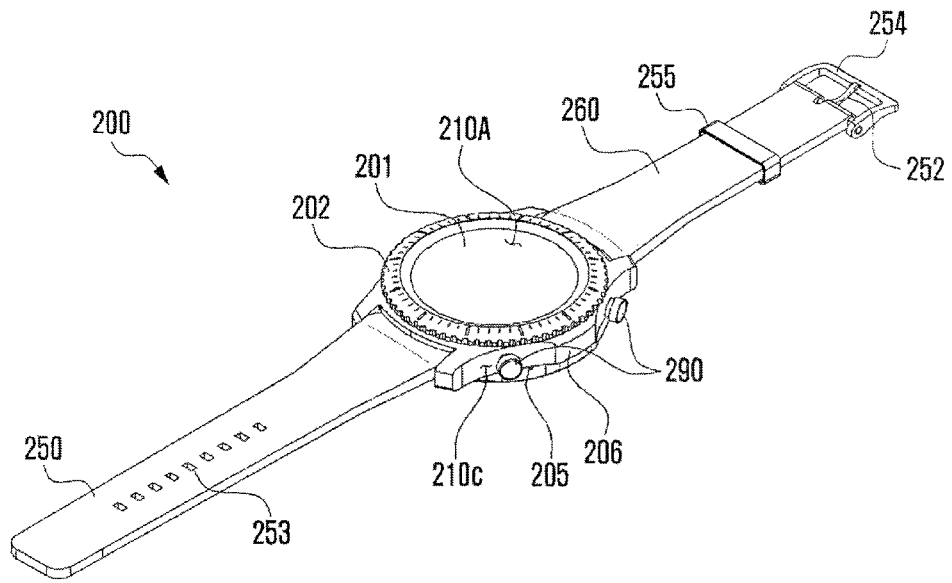
FIG. 2 is a front perspective view illustrating an electronic device according to an embodiment of the disclosure.

FIG. 2 is a front perspective view illustrating an electronic device according to an embodiment of the disclosure.

Figure 3:
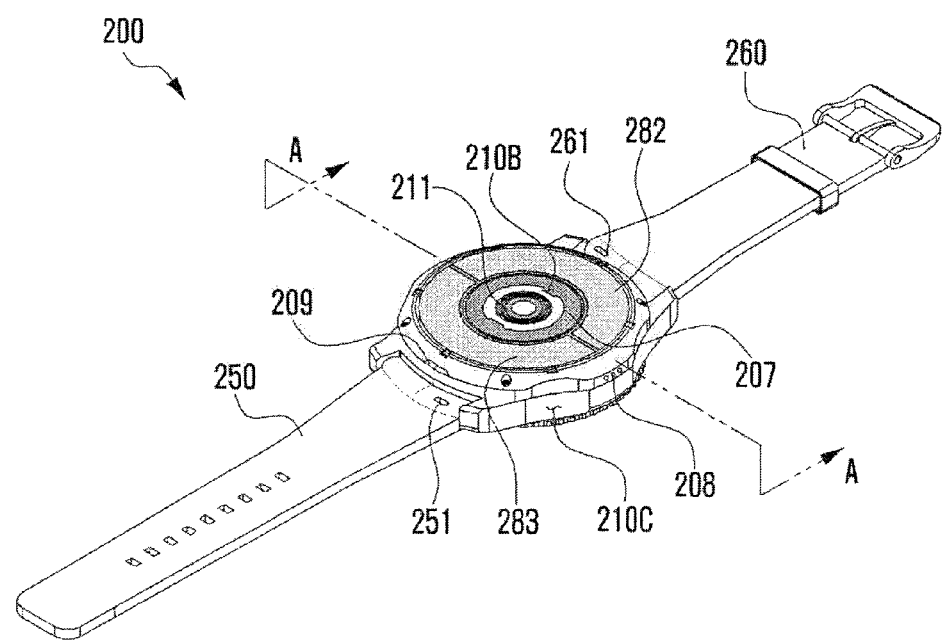
FIG. 3 is a rear perspective view illustrating an electronic device according to an embodiment of the disclosure.

FIG. 3 is a rear perspective view illustrating an electronic device according to an embodiment of the disclosure.

Figure 4:
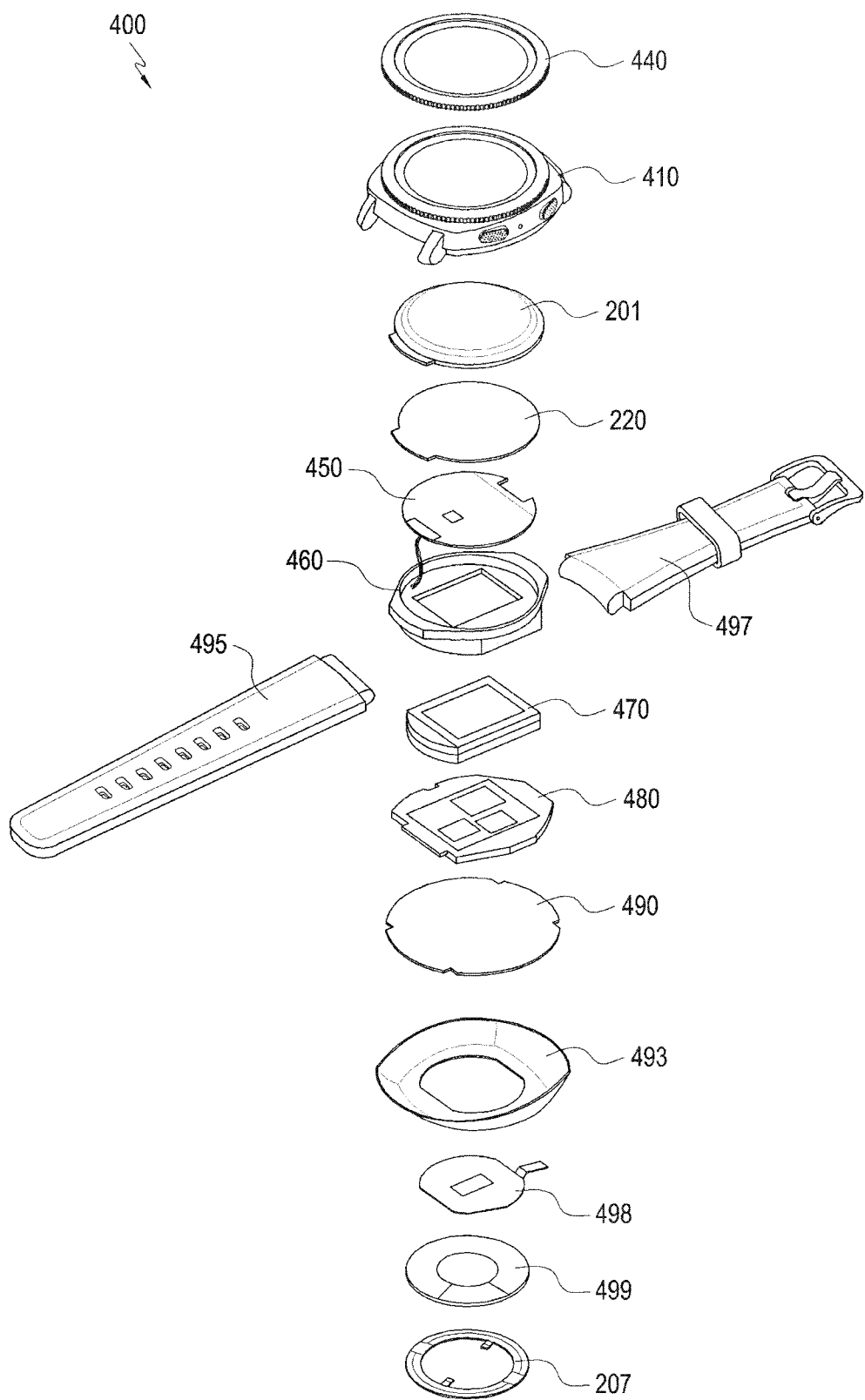
FIG. 4 is an exploded perspective view illustrating an electronic device according to an embodiment of the disclosure.

FIG. 4 is an exploded perspective view illustrating an electronic device according to an embodiment of the disclosure.

Referring to FIGS. 2 to 4, according to various embodiments of the disclosure, an electronic device 200 (e.g., the electronic device 101 of FIG. 1) may include a housing 210 including a first surface (or front surface) 210A, a second surface (or rear surface) 210B, and a side surface 210C surrounding the space between the first surface 210A and the second surface 210B and coupling members 250 and 260 connected to at least part of the housing 210 and configured to allow the electronic device 200 to be removably worn on the user's body portion (e.g., the user's wrist or ankle). According to another embodiment (not shown), the housing may denote a structure forming part of the first surface 210A, the second surface 210B, and the side surface 210C of FIG. 2. According to an embodiment, the first surface 210A may be formed by a front plate 201 (e.g., a glass plate or polymer plate with various coat layers) at least part of which is substantially transparent. The second surface 210B may be formed by a rear cover 207 that is substantially opaque. The rear cover 207 may be formed of, e.g., laminated or colored glass, ceramic, polymer, metal (e.g., aluminum, stainless steel (STS), or magnesium), or a combination of at least two thereof. The side surface 210C may be formed by a side bezel structure (or a "side member") 206 that couples to the front plate 201 and the rear cover 207 and includes a metal and/or polymer. According to an embodiment, the rear cover 207 and the side bezel plate 206 may be integrally formed together and include the same material (e.g., a metal, such as aluminum). The coupling members 250 and 260 may be formed of various materials in various shapes. A uni-body structure or multiple unit links which are flexible may be formed of fabric, leather, rubber, urethane, metal, ceramic, or a combination of at least two thereof.

According to an embodiment, electrodes 282 and 283 formed of a conductive material may be formed in one area of the rear cover 207 of the electronic device 200. According to an embodiment, additional electrodes may be formed on the side bezel structure 206. For example, the electronic device 200 may include two electrodes (e.g., electrodes 282 and 283) and an additional electrode in the side bezel structure 206 to measure electrocardiogram (ECG) signals. In an embodiment, although not illustrated in FIGS. 2 to 4, the electronic device 200 may include four or more electrodes (e.g., four or eight electrodes) to measure bio-electrical impedance analysis (BIA) signals.

According to an embodiment, the electronic device 200 may include at least one or more of a display 220 (refer to FIG. 4), audio modules 205 and 208, a sensor module 211, key input devices 202 and 290, and a connector hole 209. According to an embodiment, the electronic device 200 may exclude at least one (e.g., the key input devices 202 and 290, the connector hole 209, or the sensor module 211) of the components or may add other components.

The display 220 may be exposed through a significant portion of the front plate 201. The display 220 may have a shape corresponding to the shape of the front plate 201, e.g., a circle, ellipse, or polygon. The display 220 may be coupled with, or disposed adjacent, a touch detection circuit, a pressure sensor capable of measuring the strength (pressure) of touches, and/or fingerprint sensor.

The audio modules 205 and 208 may include a microphone hole 205 and a speaker hole 208. The microphone hole 205 may have a microphone inside to obtain external sounds. According to an embodiment, there may be a plurality of microphones to be able to detect the direction of a sound. The speaker hole 208 may be used for an external speaker or a receiver for phone talks. According to an embodiment, the speaker hole 208 and the microphone hole 205 may be implemented as a single hole, or without the speaker hole 208, a speaker (e.g., a Piezo speaker) may be included.

The sensor module 211 may produce an electrical signal or data value corresponding to the internal operation state or external environment state of the electronic device 200. The sensor module 211 may include, e.g., a biometric sensor module 211 (e.g., a heartrate monitor (HRM) sensor) disposed on the second surface 210B of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 202 and 290 may include a wheel key 202 disposed on the first surface 210A of the housing 210 to be rotatable in at least one direction and/or key buttons 290 disposed on the side surface 210C of the housing 210. The wheel key 202 may have a shape corresponding to the shape of the front plate 201. According to an embodiment, the electronic device 200 may exclude all or some of the above-mentioned key input devices 202 and 290, and the excluded key input device 202 or 290 may be implemented in other forms, e.g., as soft keys, on the display 220. The connector hole 209 may receive a connector (e.g., a universal serial bus (USB) connector) for transmitting and receiving power and/or data to/from an external electronic device. Another connector hole (not shown) may be included for receiving a connector for transmitting and receiving audio signals to/from the external electronic device. The electronic device 200 may further include a connector cover (not shown) to cover at least part of, e.g., the connector hole 209 and preventing undesirable materials from entering the connector hole.

The coupling members 250 and 260 may detachably be fastened to at least portions of the housing 210 via locking members 251 and 261. The coupling members 250 and 260 may include one or more of a fastening member 252, fastening member coupling holes 253, a band guide member 254, and a band fastening ring 255.

The fastening member 252 may be configured to allow the housing 210 and the coupling members 250 and 260 to be fastened to the user's body portion (e.g., wrist or ankle). The fastening member coupling holes 253 may fasten the housing 210 and the coupling members 250 and 260 to the user's body portion, corresponding to the fastening member 252. The band guide member 254 may be configured to restrict movement of the fastening member 252 to a certain range when the fastening member 252 fits into one of the fastening member coupling holes 253, thereby allowing the coupling members 250 and 260 to be tightly fastened onto the user's body portion. The band fastening ring 255 may limit the range of movement of the coupling members 250 and 260, with the fastening member 252 fitted into one of the fastening member coupling holes 253.

Referring to FIG. 4, an electronic device 400 (e.g., the electronic device 101 or the electronic device 200) may include a side bezel structure 410, a wheel key 440, a front plate 201, a display 220, a first antenna 450, a supporting member 460 (e.g., bracket), a battery 470, a first printed circuit board 480, a sealing member 490, a rear plate 493, a second printed circuit board 498, a coil 499 for wireless charging, a rear cover 207, and coupling members 495 and 497. At least one of the components of the electronic device 400 may be the same or similar to at least one of the components of the electronic device 200 of FIG. 2 or 3 and no duplicate description is given below. The supporting member 460 may be disposed inside the electronic device 400 to be connected with the side bezel structure 410 or integrated with the side bezel structure 410. The supporting member 460 may be formed of, e.g., a metal and/or non-metallic material (e.g., polymer). The display 220 may be joined onto one surface of the supporting member 460, and the first printed circuit board 480 may be joined onto the opposite surface of the supporting member 460. A processor (e.g., the processor 120), a memory (e.g., the memory 130), and/or an interface may be mounted on the first printed circuit board 480. The processor may include one or more of, e.g., a central processing unit, an application processor, a graphic processing unit (GPU), a sensor processor, or a communication processor.

According to an embodiment, the memory may include, e.g., a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 400 with an external electronic device and may include a USB connector, an SD card/multimedia card (MMC) connector, or an audio connector.

According to an embodiment, the battery 470 may be a device for supplying power to at least one component of the electronic device 400. The battery 470 may include, e.g., a primary cell which is not rechargeable, a secondary cell which is rechargeable, or a fuel cell. At least a portion of the battery 470 may be disposed on substantially the same plane as the first printed circuit board 480. The battery 470 may be integrated or detachably disposed inside the electronic device 400.

According to an embodiment, the first antenna 450 may be disposed between the display 220 and the supporting member 460. The first antenna 450 may include, e.g., a near-field communication (NFC) antenna, a wireless charging antenna, and/or a magnetic secure transmission (MST) antenna. The first antenna 450 may perform short-range communication with an external device, wirelessly transmit/receive power necessary for charging, or transmit magnetic-based signals including payment data or short-range communication signals. According to an embodiment, an antenna structure may be formed by a portion or combination of the side bezel structure 410 and/or the supporting member 460.

According to an embodiment, the sealing member 490 may be positioned between the side bezel structure 410 and the rear plate 493. The sealing member 490 may be configured to block moisture or foreign bodies that may enter the space surrounded by the side bezel structure 410 and the rear plate 493, from the outside.

According to an embodiment, a second printed circuit board (e.g., a printed circuit board (PCB), a flexible printed circuit board (FPCB), or a rigid-flexible PCB (RFPCB)) and the wireless charging coil 499 may be disposed between the rear plate 493 and the rear cover 207.

Figure 5:
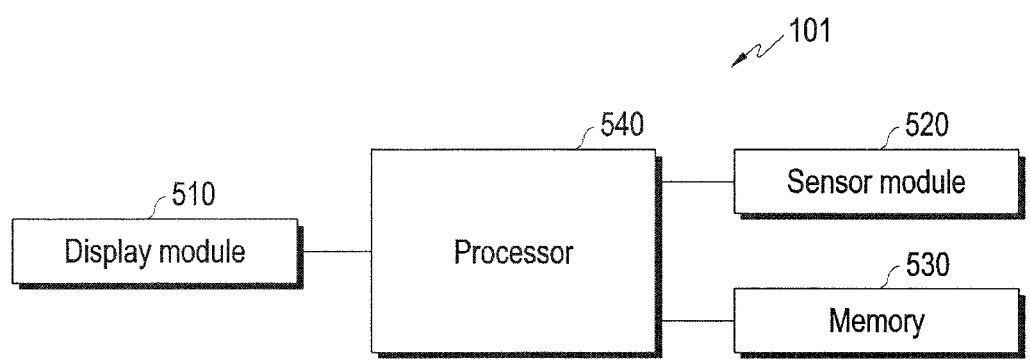
FIG. 5 is a block diagram illustrating an electronic device according to an embodiment of the disclosure.

FIG. 5 is a block diagram illustrating an electronic device according to an embodiment of the disclosure.

Referring to FIG. 5, according to an embodiment, an electronic device 101 may include a display 510, a sensor module 520, a memory 530, and a processor 540. In an embodiment, the display module 510 may be included in at least one of the display module 160 of FIG. 1 or the display module 220 of FIG. 4. In an embodiment, the sensor module 520 may be included in at least one of the sensor module 176 of FIG. 1 or the sensor module 211 of FIG. 2. According to an embodiment, the memory 530 may be included in the memory 130 of FIG. 1. According to an embodiment, the processor 540 may be included in the processor 120 of FIG. 1.

In an embodiment, the processor 540 may obtain sensing data from the sensor module 520. The sensor module 520 may sense information for the movement of the electronic device 101. For example, the sensor module 520 may include at least one of a gyro sensor, an acceleration sensor, or a geomagnetic sensor, and may sense motion information. The sensor module 520 may sense a biometric signal of the user wearing the electronic device 101. For example, the sensor module 520 may include at least one of a photoplethysmogram (PPG) sensor or an electrocardiogram (ECG) sensor, and may sense biometric signals.

In an embodiment, the processor 540 may recognize a gesture based on sensing data obtained from the sensor module 520. When a gesture recognition request from a specific application is identified, the processor 540 may execute a gesture application to perform gesture recognition, and accordingly, the processor 540 may refrain from constant gesture recognition. The processor 540 may perform at least one operation corresponding to the recognized gesture. For example, the processor 540 may display information for at least one operation corresponding to the recognized gesture on the display module 510.

In an embodiment, the memory 530 may store at least one algorithm (or model or instruction) required in the gesture recognition process. The memory 530 may temporarily store the intermediate results of execution of a plurality of algorithms (or models or instructions). The memory 530 may store at least one application and a gesture application for gesture recognition. The at least one application may be configured to provide a gesture recognition request and perform at least one operation corresponding to the received gesture. The memory 530 may store data, such as recognizable gestures for each application and feature value data for each gesture as illustrated in Table 1, which is described below.

Figure 6A:
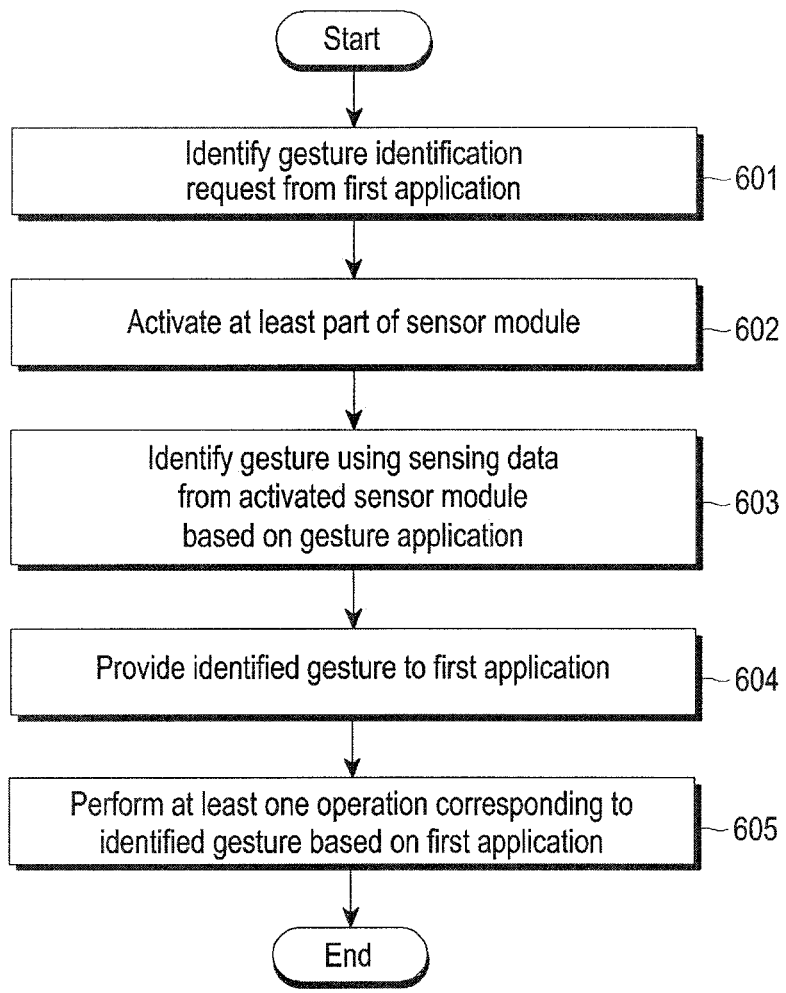
FIG. 6A is a flowchart illustrating a method for operating an electronic device according to an embodiment of the disclosure.
Figure 6B:
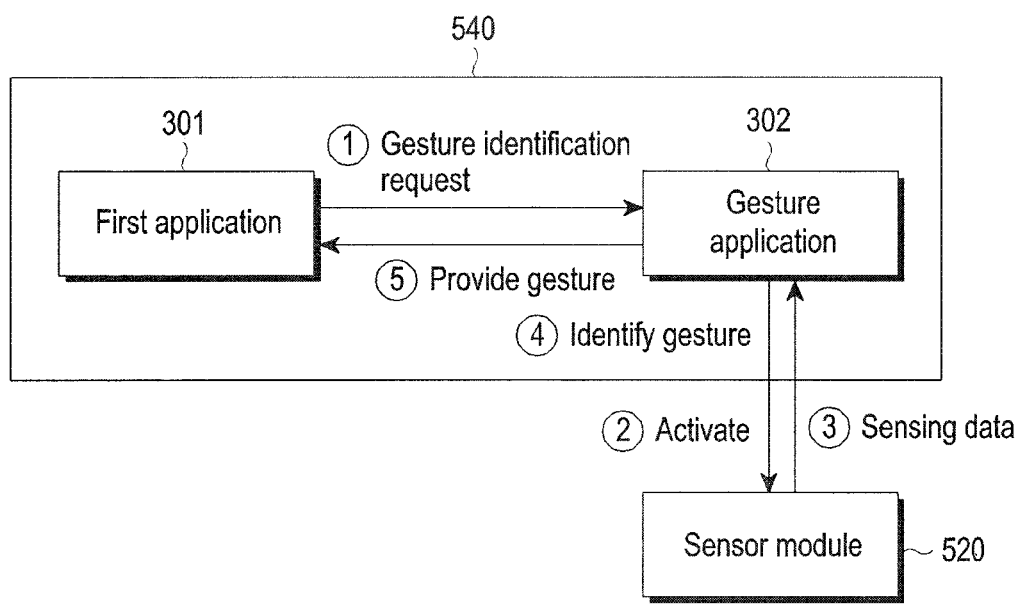
FIG. 6B is a block diagram illustrating an electronic device according to an embodiment of the disclosure.

FIG. 6A is a flowchart illustrating a method for operating an electronic device according to an embodiment of the disclosure. The embodiment of FIG. 6A is described with reference to FIG. 6B. FIG. 6B is a block diagram illustrating an electronic device according to an embodiment of the disclosure.

Figure 7:
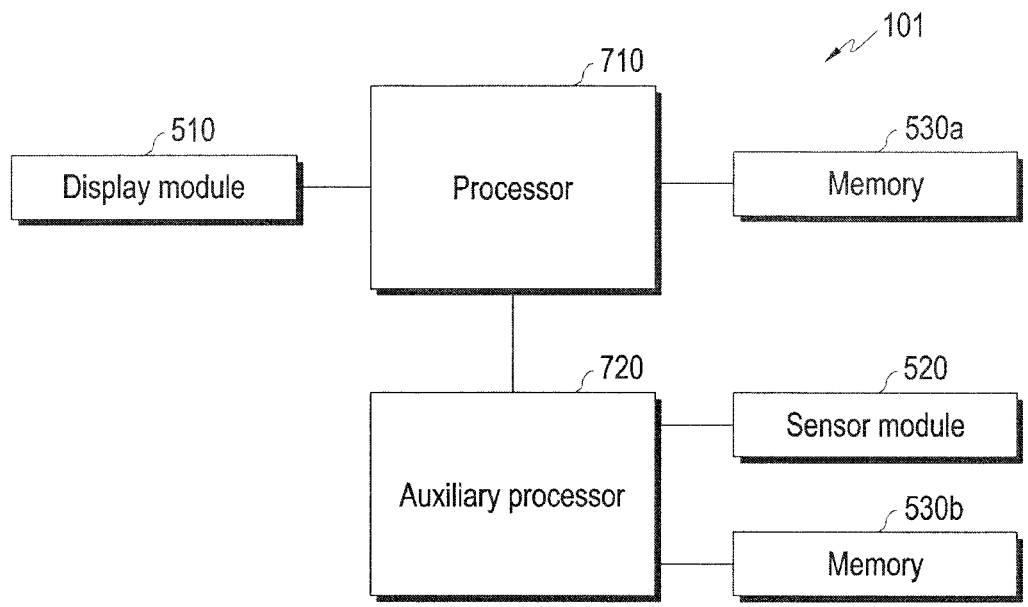
FIG. 7 is a block diagram illustrating an electronic device according to an embodiment of the disclosure.
Figure 8:
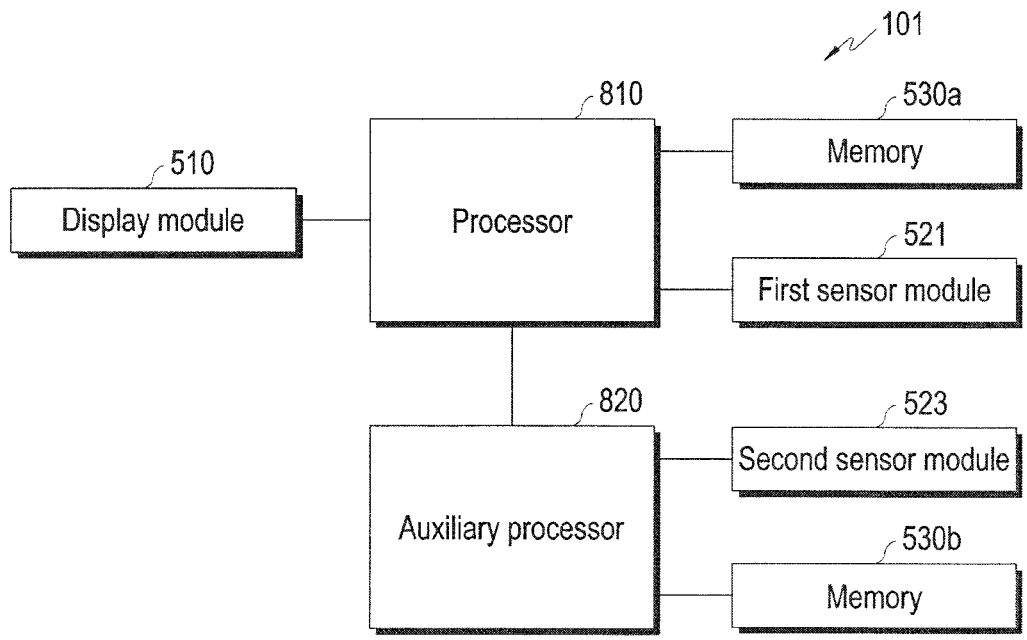
FIG. 8 is a block diagram illustrating an electronic device according to an embodiment of the disclosure.

Referring to FIGS. 6A and 6B, according to various embodiments of the disclosure, an electronic device 101 (e.g., a device including at least one of the processor 540 of FIG. 5, the processor 710 or the auxiliary processor 720 of FIG. 7, or the processor 810 or the auxiliary processor 820 of FIG. 8) may identify a gesture identification request from a first application 301 in operation 601. For example, the electronic device 101 may execute the first application 301 as illustrated in FIG. 6B. For example, the first application 301 may include correlation information between an event, a gesture, and/or at least one corresponding operation. The gesture application 302 may be included in the middleware 144 or the operating system 142 of FIG. 1. The first application 301 may be included in the application 146 of FIG. 1. The first application 301 and/or the gesture application 302 may be executed by the processor 540. For example, the correlation information illustrated in Table 1 may be included in the first application 301 (e.g., a phone application).

TABLE 1

| Event | Gesture | Corresponding operation |
| --- | --- | --- |
| incoming call event | shake | accept the call |
| | open-close-open (OCO) | decline the call |
| missed call information providing event | shake | make a call at the number of the missed call |
| | OCO | display the home screen |

For example, upon identifying an occurrence of an 'incoming call event' associated with the first application 301, the first application 301 may generate a gesture recognition request. Alternatively, upon identifying an occurrence of a 'missed call information providing event' associated with the first application 301, the first application 301 may generate a gesture recognition request. The electronic device 101 may identify the gesture recognition request from the first application 301. It will be understood by those skilled in the art that the events in Table 1 are merely an example, and types of events are not limited thereto. In addition to the OCO gesture and the shake gesture, the electronic device 101 may recognize gestures of turning a hand, moving a hand with the palm open, lifting an arm, moving a thumb, moving down a hand, or moving up a hand, but gesture types are not limited thereto. The gesture may be recognized based on information indicating movement of the electronic device 101 and/or the user's biometric signal (e.g., a signal indicating relaxation/contraction of blood vessels or a heartbeat signal). According to an embodiment, the electronic device 101 may activate at least a portion of the sensor module based on the gesture application in operation 602. For example, the electronic device 101 may activate a sensor module for detecting gestures that may be processed by an application. The electronic device 101 may activate at least one sensor module 520 that has been deactivated, based on the gesture recognition request. In one example, the electronic device 101 may activate at least one sensor 520 for sensing a corresponding gesture based on a gesture that may be processed by the first application 301. It will be understood by a person skilled in the art will that if the sensor required to be activated is already running, the electronic device 101 may skip the operation for activating the sensor. In one example, the electronic device 101 may execute the gesture application 302 based on the gesture recognition request. However, in various examples, the gesture application 302 may be implemented to be not executed before a gesture recognition request is generated but executed based on a gesture recognition request or to be executed all the time regardless of the gesture recognition request. According to an embodiment, the gesture application may be included in the first application 301. For example, instructions of the gesture application may be included in the first application 301. Alternatively, the gesture application may mean at least one instruction.

According to an embodiment, in operation 603, the electronic device 101 may identify the gesture using the sensing data from the activated sensor module based on the gesture application 302. The first application 301 may provide a gesture recognition request to the gesture application 302.

According to an embodiment, the electronic device 101 may provide the gesture identified in operation 605 to the first application 301. The gesture application 301 may identify the gesture based on the sensing data from the activated sensor module 520, and may provide the identified gesture to the first application 301. For example, the gesture application 302 may identify the segmentation section of the sensing data based on the result of summation of the sensing data for a predetermined section, which is described below. The gesture application 302 may perform gesture recognition based on the identified segmentation section. In operation 607, the electronic device 101 may perform at least one operation corresponding to the identified gesture based on the first application 301. If a shake gesture is provided during the incoming call event of the first application 301 (e.g., a phone application), the electronic device 101 may perform an operation for accepting the call. If an OCO gesture is provided during the incoming call event of the first application 301 (e.g., a phone application), the electronic device 101 may perform an operation for declining the call. Alternatively, the electronic device 101 may be implemented so as to perform no specific operation until the incoming call event ends. If a shake gesture is provided during the missed call information providing event of the first application 301 (e.g., a phone application), the electronic device 101 may perform an operation for making a call at the number of the missed call. If an OCO gesture is provided during the missed call information providing event of the first application 301 (e.g., a phone application), the electronic device 101 may perform an operation for displaying the home screen.

According to an embodiment, the electronic device 101 may perform an operation corresponding to a gesture based on a camera application or an alarm application, as well as the above-described phone application, and application types are not limited thereto. For example, when a camera application is executed, the electronic device 101 may take a picture in response to an OCO gesture. For example, when an alarm application is executed, the electronic device 101 may release the alarm in response to a shake gesture. For example, the electronic device 101 may output information for guiding the user to make a gesture in a stable arm position.

Figure 6C:
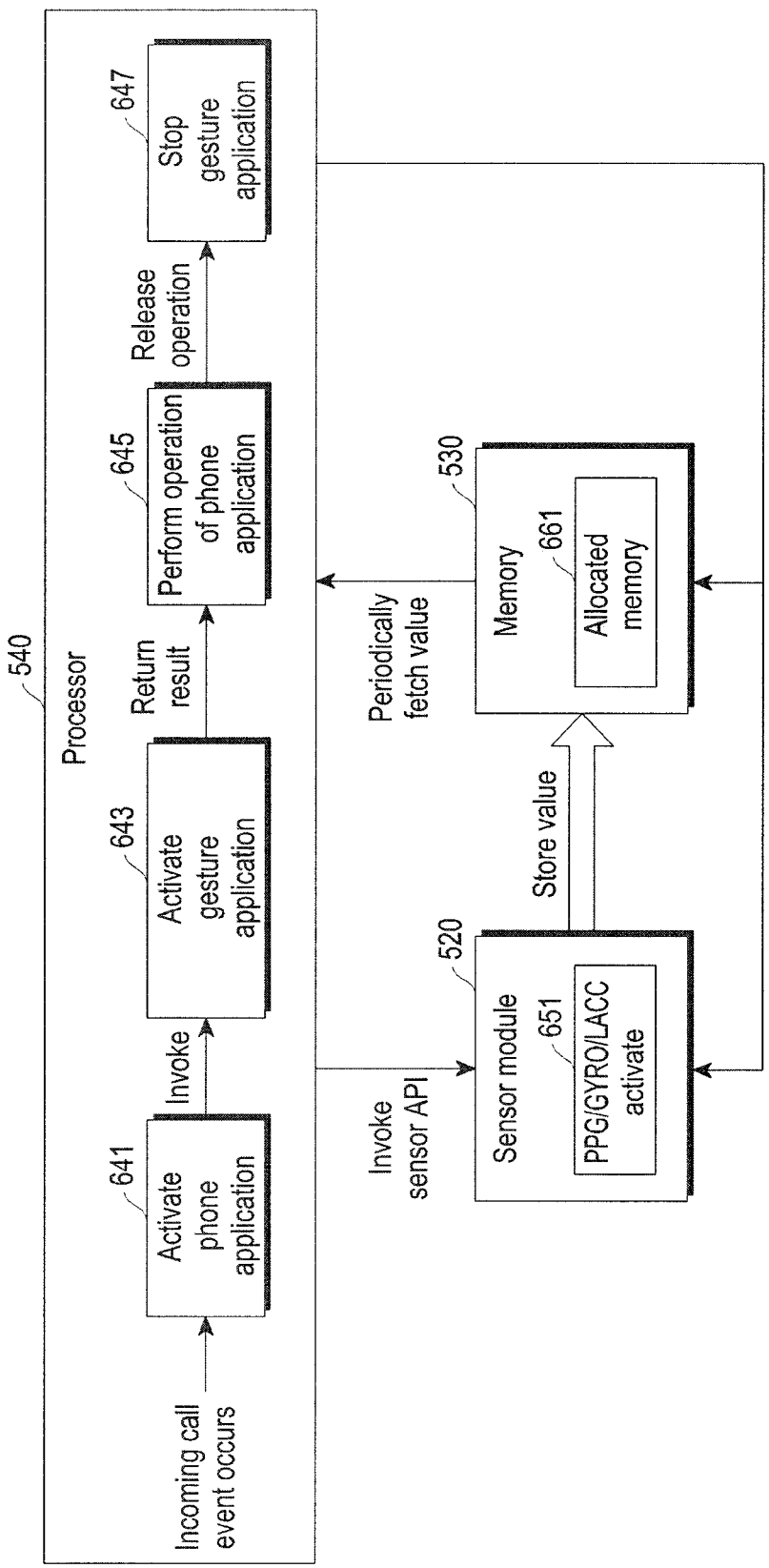
FIG. 6C is a view illustrating operations of an electronic device according to an embodiment of the disclosure.

FIG. 6C is a view illustrating operations of an electronic device according to an embodiment of the disclosure.

Referring to FIG. 6C, the processor 540 may identify an occurrence of an incoming call event as a trigger to allow the processor 540 to activate a phone application. Accordingly, the processor 540 may activate the phone application in operation 641. For example, the processor 540 may identify that the application corresponding to the incoming call event is a phone application, and activate the identified phone application. In the phone application, correlation information between gestures and corresponding operations may be set, e.g., accepting the call in response to a shake gesture or declining the call in response to an OCO gesture. Accordingly, the phone application may invoke the gesture application, and in operation 643, the processor 540 may activate the gesture application. For example, the phone application may invoke an application programming interface (API) (or a gesture server) of the gesture application, and the invoked API (or gesture server) of the gesture application may activate a series of modules for gesture recognition.

The gesture application may invoke a sensor API, so that at least some sensors (e.g., a PPG sensor, a gyro sensor, and a linear accelerator (LACC)) in the sensor module 520 may be activated in operation 651. For example, the gesture application may identify information for gestures used in the phone application. For example, information for gestures recognizable by the phone application (e.g., shake gestures and OCO gestures) may be transferred to the gesture application. In another example, the gesture application may previously manage information for recognizable gestures for each application. In this case, the gesture application may identify the information for gestures recognizable by the phone application (e.g., shake gesture and OCO gesture) based on the pre-managed information.

The gesture application may activate at least some sensor module among sensor modules 520, e.g., a sensor module for recognizing gestures recognizable by the phone application, based on the information for gestures recognizable by the phone application. According to an embodiment, the electronic device 101 may activate a sensor module for sensing data used in segmentation, in addition to the sensor module corresponding to the phone application, which is described below. The activated sensor module may store the sensed value in a memory 661 allocated in the memory 530. The gesture application may periodically read or retrieve a value from the memory 661 allocated in the memory 530. However, such periodic value reading is merely an example. According to an embodiment, the processor 540 may receive information (or data) directly from the sensor module 520 without going through the memory 530.

The gesture application may determine whether to perform segmentation based on the periodically received sensed values. For example, the gesture application may determine whether to perform segmentation based on the accumulated data. As described below, segmentation needs to first be performed to perform subsequent additional recognition. If segmentation is performed, the gesture application may perform a recognition operation using the segmented value. If no segmentation is performed, the gesture application may refrain from further subsequent recognition. Thus, it is possible to reduce unnecessary resource waste as compared with when recognition is performed on all sensing data.

The gesture application may recognize a gesture using the segmented signal. When the gesture recognition is completed, the gesture application may provide the results of recognition to the phone application. The phone application may perform an operation corresponding to the gesture in operation 645. If the gesture application provides the result of recognition of the OCO gesture to the phone application, the phone application may perform a call rejection which corresponds to the OCO gesture. If the corresponding operation is performed, the phone application may request the gesture application to release the operation. In operation 647, the gesture application may stop (or terminate) execution based on the received request.

FIG. 7 is a block diagram illustrating an electronic device according to an embodiment of the disclosure.

Referring to FIG. 7, an electronic device 101 may include a display module 510, a sensor module 520, memories 530*a* and 530*b*, a processor 710, and an auxiliary processor 720. According to an embodiment, the auxiliary processor 720 may be operably connected with the sensor module 520, the memory 530*b*, and the processor 710. According to an embodiment, the processor 710 may be operably connected with the display module 510, the auxiliary processor 720, and the memory 530*a*. Although FIG. 7 illustrates that the memory 530*a* is connected to the processor 710, this is merely an example, and the memory 530*a* may be implemented to be included in the processor 710. Further, although the memory 530*b* is illustrated as being connected to the auxiliary processor 720, this is merely an example, and the memory 530*b* may be implemented to be included in the auxiliary processor 720. The memory 530*a* and the memory 530*b* may be different components or, although not shown, may be implemented as one memory. According to an embodiment, the auxiliary processor 720 may be included in the auxiliary processor 123 of FIG. 1. In an embodiment, the auxiliary processor 720 may operate at a lower power level than the processor 710. In an embodiment, the auxiliary processor 720 may include a micro controller unit (MCU) (e.g., a sensor hub). The auxiliary processor 720 may always be in an active state. For example, when the processor 710 is in the sleep state, the auxiliary processor 720 may identify sensing data from at least some of the sensor modules 520. Upon identifying that the sensing data meets a designated condition (e.g., when the magnitude of the sensed movement of the electronic device 101 is a threshold or more), the auxiliary processor 720 may wake up the processor 710. The auxiliary processor 720 may process information for sensing data to be identified even when the processor 710 is in the sleep state. For example, if a walk check is set in the electronic device 101, the auxiliary processor 720 may continuously identify sensing data for sensing a walk even while the processor 710 is in the sleep state and may store the sensing data and, after the processor 710 wakes up, transfer the sensing data to the processor 710.

As described above, the processor 710 may obtain sensing data from at least one sensor of the sensor module 520 through the auxiliary processor 720, based on a gesture identification request from the first application. According to an embodiment, the auxiliary processor 720 may relay at least one piece of sensing data from at least one sensor of the sensor module 520 to the processor 710 or may partially process the sensing data and transfer the processed sensing data to the processor 710. Alternatively, the processor 710 may receive sensing data directly from the sensor module 520. According to an embodiment, the gesture application may be executed on the processor 710 or may be executed on the auxiliary processor 720. If the auxiliary processor 720 executes the gesture application, the auxiliary processor 720 may be configured to receive a gesture recognition request from the processor 710 and, in response thereto, provide a result of gesture recognition. The application running on the processor 710 may perform a corresponding operation based on the result of gesture recognition received from the auxiliary processor 720. If the processor 710 executes the gesture application, the processor 720 may recognize a gesture based on sensing data received through the auxiliary processor 720.

FIG. 8 is a block diagram illustrating an electronic device according to an embodiment of the disclosure.

Referring to FIG. 8, an electronic device 101 may include a display module 510, memories 530a and 530b, a processor 810, an auxiliary processor 820, a first sensor module 521 operated under the control of the processor 810, and a second sensor module 523 operated under the control of the auxiliary processor 820. For example, the first sensor module 521 may be at least one module for measuring data that does not need to be obtained when the processor 810 is in a sleep state. For example, among the plurality of sensors included in the electronic device 101, the first sensor module 521 and the second sensor module 523 may be divided according to the settings of the electronic device 101. The second sensor module 523 may be at least one module for measuring data that needs to be obtained when the processor 810 is in the sleep state. For example, even when the processor 810 is in the sleep state, the second sensor module 523 may be configured to measure information, such as the user's electrocardiogram or step count and, in this case, the auxiliary processor 820 may obtain sensing data from the second sensor module 523 to measure the user's electrocardiogram or step count. According to an embodiment, the auxiliary processor 820 may be configured to wake up the processor 810 when it is identified that the sensing data obtained from the second sensor module 523 meets a designated condition. According to an embodiment, the auxiliary processor 820 may store the sensing data obtained from the second sensor module 523 while the processor 810 is in the sleep state and transmits the sensing data to the processor 810 when the processor 810 wakes up.

According to an embodiment, the processor 810 may execute a first application (e.g., a phone application). The first application may request the gesture application to perform gesture recognition based on a trigger, such as an incoming call event. The gesture application may be executed by the processor 810 or may be executed by the auxiliary processor 820. If the gesture application is executed by the processor 810, the gesture application may recognize a gesture based on sensing data from at least one of the first sensor module 521 and the second sensor module 523.

Figure 9:
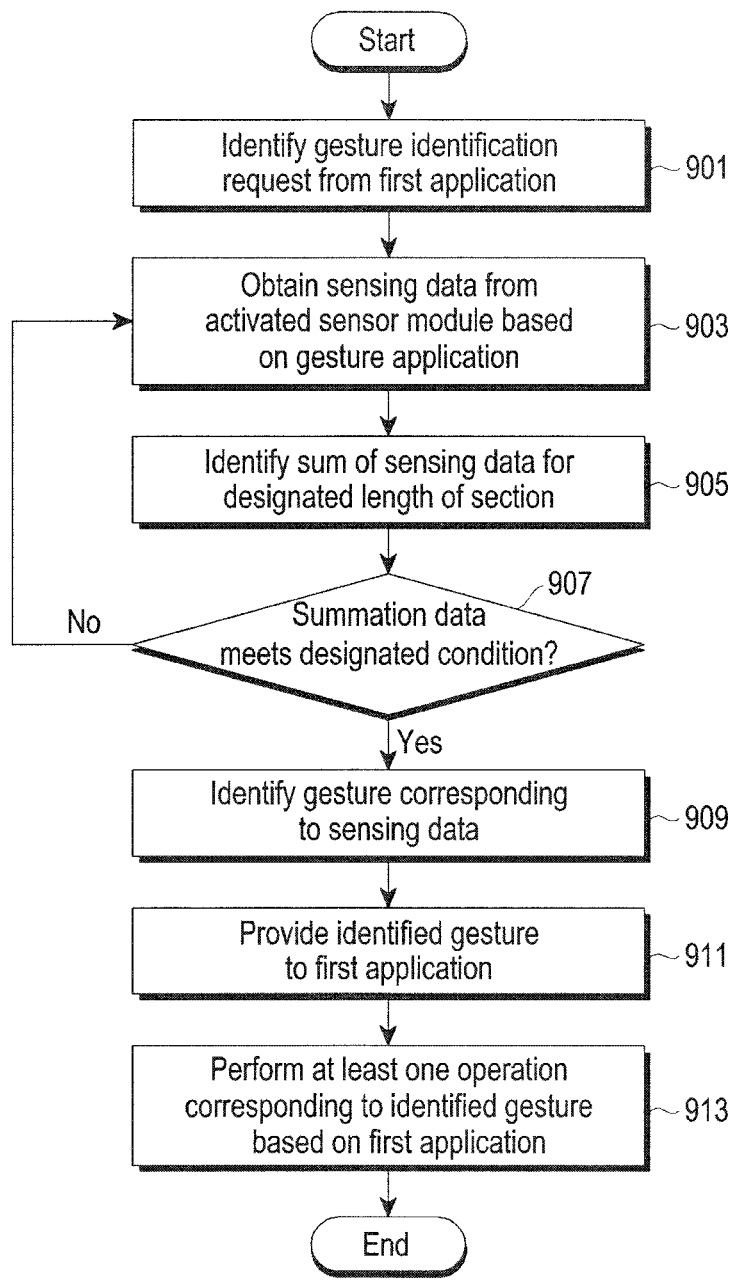
FIG. 9 is a flowchart illustrating a method for operating an electronic device according to an embodiment of the disclosure.

FIG. 9 is a flowchart illustrating a method for operating an electronic device according to an embodiment of the disclosure. The embodiment of FIG. 9 is described with reference to FIG. 10.

Figure 10:
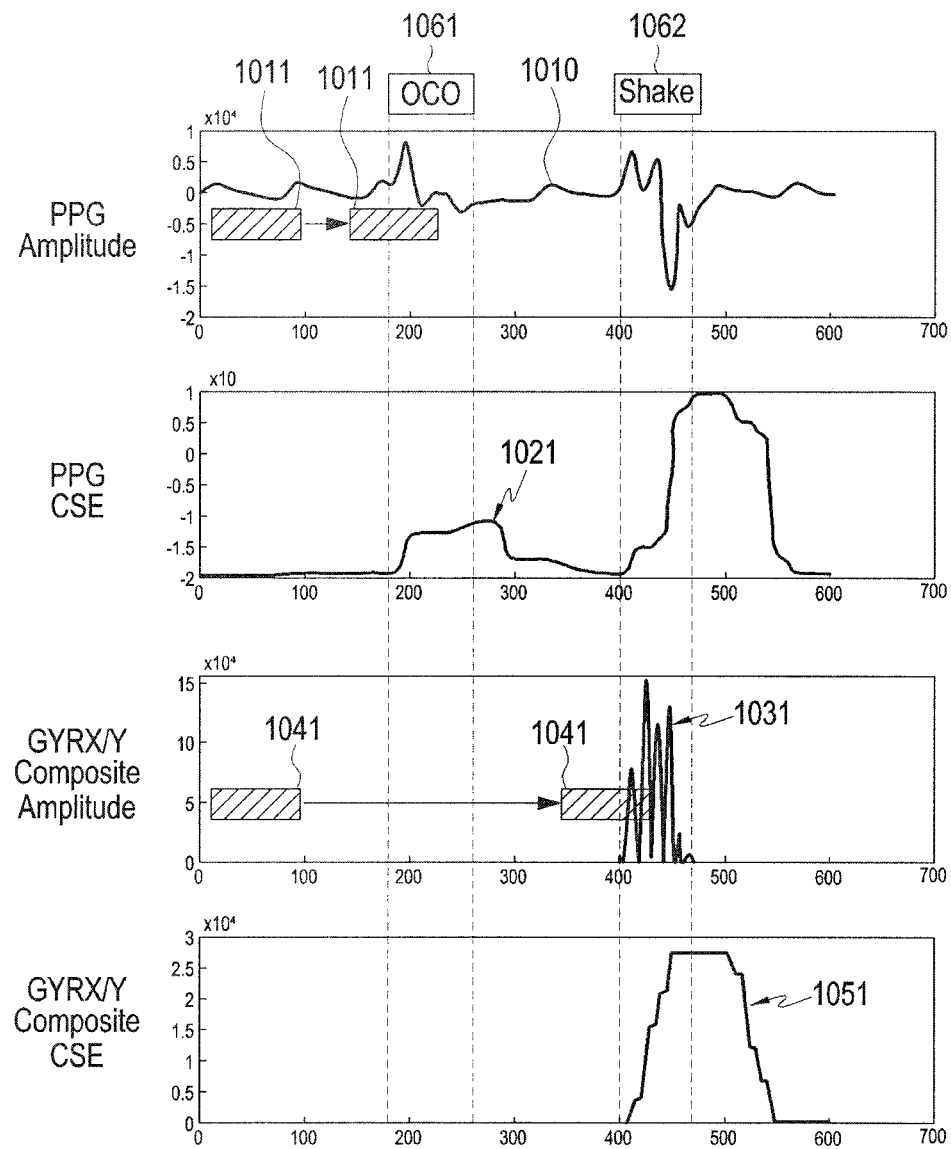
FIG. 10 illustrates graphs representing sensing data and summation data according to an embodiment of the disclosure.

FIG. 10 illustrates graphs representing sensing data and summation data according to an embodiment of the disclosure.

According to an embodiment, an electronic device 101 (e.g., at least one of the processor 540 of FIG. 5, the processor 710 or the auxiliary processor 720 of FIG. 7, or the processor 810 or the auxiliary processor 820 of FIG. 8) may identify a gesture identification request from a first application 301 (e.g., the first application 301 of FIG. 6B) in operation 901. Although not shown, the electronic device 101 may activate at least a portion of the sensor module (e.g., the sensor module 520 of FIG. 5) based on the gesture application (e.g., the gesture application 302 of FIG. 6B).

Referring to FIG. 9, in operation 903, the electronic device 101 may obtain sensing data from the activated sensor module based on the gesture application (e.g., the gesture application 302 of FIG. 6B). For example, the gesture application may obtain first sensing data 1010 of the PPG amplitude of FIG. 10 from a PPG sensor. For example, the gesture application may obtain second sensing data 1031 of the gyro x/y composite amplitude (GYRX/Y composite amplitude) from a gyro sensor. The electronic device 101 may obtain all sensing data for observing both an OCO gesture and a shake gesture. The electronic device 101 may observe each of, e.g., a GYRX signal and a GYRY signal or may also observe a GYRX/Y signal that is a synthesized signal of the GYRX signal and the GYRY signal as illustrated in FIG. 10.

According to an embodiment, in operation 905, the electronic device 101 may identify the sum of the sensing data for a designated length of section. The electronic device 101 may identify the sum of the sensing data during a first length of section 1011 for the first sensing data 1010. FIG. 10 illustrates first summation data 1021 of the first sensing data 1010 for the first length of section length 1011. The summation data for PPG amplitude may be referred to as PPG cumulated signal energy (CSE). The electronic device 101 may identify the first summation data 1021 while sliding the first length of section 1011. The electronic device 101 may identify the sum of the sensing data during a second length of section 1041 for the second sensing data 1031. The second length of section 1041 and the first length of section 1011 may be the same but may be set to differ from each other. The first length of section 1011 may be set to a period of time (e.g., 0.96 seconds) of a specific gesture, but is not limited thereto.

FIG. 10 illustrates second summation data 1051 of the second sensing data 1031 for the second length of section length 1041. The summation data for the gyro x/y composite amplitude (GYRX/Y composite amplitude) may be referred to as gyro x/y composite cumulated signal energy (GYRX/Y composite CSE). The electronic device 101 may identify the second summation data 1011 while sliding the second length of section 1041.

In operation 907, the electronic device 101 may determine whether the summation data meets a designated condition. The designated condition may be, e.g., whether the magnitude of the summation data exceeds a designated threshold, whether the per-hour change rate exceeds a designated threshold change rate, and/or whether a ratio between a plurality of pieces of summation data exceeds a designated value, but is not limited thereto. The designated condition may be set to differ for each type of sensing data. If the designated condition is not met (no in operation 907), the electronic device 101 may repeat the operation 903 of sensing data (operation 903) and the operation 905 of identifying the sum of the sensing data. If it is determined that the designated condition is met (yes in 907), the electronic device 101 may identify a gesture corresponding to the sensing data in operation 909. For example, referring to FIG. 10, the electronic device 101 may identify whether the first summation data 1021 meets a first designated condition while the user makes an OCO gesture 1061, with the electronic device 101 worn. For example, the first designated condition may be that a ratio of the current summation data to a first reference associated with the first summation data 1021 exceeds a first threshold ratio, but is not limited thereto. The electronic device 101 may perform gesture recognition on the first sensing data 1010 based on identifying that the first designated condition is met. Details of gesture recognition are described below. The electronic device 101 may identify an OCO gesture based on the result of gesture recognition on the first sensing data 1010. For example, the electronic device 101 may identify that the first summation data 1051 meets a second designated condition while the user makes a shake gesture, with the electronic device 101 worn. For example, the second designated condition may be that a ratio of the current summation data to a second reference associated with the second summation data 1051 exceeds a second threshold ratio, but is not limited thereto. The electronic device 101 may perform gesture recognition on the second sensing data 1031 based on identifying that the second designated condition is met. The electronic device 101 may identify a shake gesture 1062 based on the result of gesture recognition on the second sensing data 1031.

In operation 911, the electronic device 101 may provide the identified gesture to the first application. In operation 913, the electronic device 101 may perform at least one operation corresponding to the identified gesture based on the first application. For example, the electronic device 101 may perform an operation corresponding to the identified gesture based on correlation information for an operation corresponding to each gesture, set by the first application.

Figure 11:
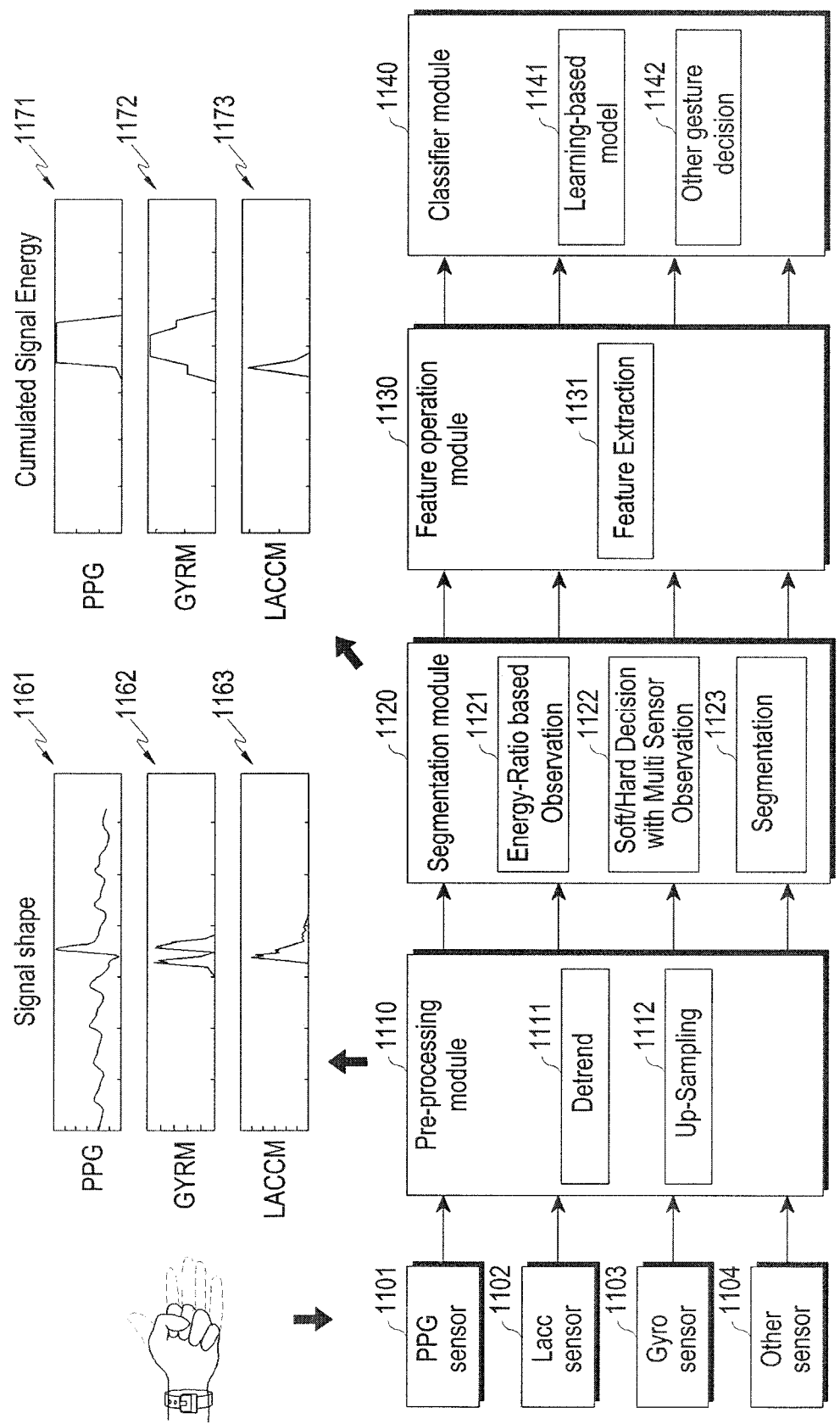
FIG. 11 is a view illustrating a gesture recognition process by an electronic device according to an embodiment of the disclosure.

FIG. 11 is a view illustrating a gesture recognition process by an electronic device according to an embodiment of the disclosure.

Referring to FIG. 11, a pre-processing module 1110, a segmentation module 1120, a feature operation module 1130, and a classifier module 1140 may be programs (or instructions or applications or algorithms) executed by at least one of the processor 540 of FIG. 5, the processor 710 or auxiliary processor 720 of FIG. 7, or the processor 810 or auxiliary processor 820 of FIG. 8. Alternatively, the pre-processing module 1110, the segmentation module 1120, the feature operation module 1130, and the classifier module 1140 may be included in at least one of the processor 540, the processor 710, the auxiliary processor 720, the processor 810, or the auxiliary processor 820 or may be implemented in hardware which is disposed independently from the processor 540, the processor 710, the auxiliary processor 720, the processor 810, or the auxiliary processor 820.

According to an embodiment, the electronic device 101 may include a PPG sensor 1101, a linear acceleration (Lacc) sensor 1102, a gyro sensor 1103, and at least one other sensor 1104. The pre-processing module 1110 may receive sensing data from at least one of the sensors 1101, 1102, 1103, and 1104. The pre-processing module 1110 may perform pre-processing, including detrending 1111 and/or up-sampling 1112, on the received sensing data. The detrending 1111 is a process for detrending time-series sensing data, and is not limited to a specific processing algorithm. The up-sampling 1112 may be a process of increasing the sampling rate of the received sensing data, and is not limited to a specific processing algorithm. It will be understood by those skilled in the art that the pre-processing performed by the pre-processing module 1110 is not limited to the detrending 1111 and the up-sampling 1112. FIG. 11 illustrates first sensing data 1161 which is pre-processed PPG sensing data, second sensing data 1162 which is pre-processed gyro sensing data, and third sensing data 1163 which is pre-processed linear acceleration sensing data.

According to an embodiment, the segmentation module 1120 may receive the first sensing data 1161, the second sensing data 1162, and/or the third sensing data 1163 from the pre-processing module 1110. The segmentation module 1120 may perform segmentation on the sensing data 1161, 1162, and 1163, and transmit the segments to the feature operation module 1130. The segmentation module 1120 may generate first summation data 1171, second summation data 1172, and/or third summation data 1173 based on the received first sensing data 1161, second sensing data 1162, and/or third sensing data 1163, respectively. As described above, the segmentation module 1120 may generate the summation data in a manner of summating the data within a preset length of section in each sensing data.

For example, the segmentation module 1120 may perform energy-ratio based observation 1121. The segmentation module 1120 may identify whether a ratio between any one reference summation data and target summation data exceeds a designated value. If the ratio exceeds the designated value, the segmentation module 1120 may initiate segmentation.

For example, the segmentation module 1120 may perform a soft/hard decision with multi-sensor observation 1122. For example, the segmentation module 1120 may select whether to perform segmentation when any one of the results of the multi-sensor observation meets a condition for segmentation or to perform segmentation when all of the results of the multi-sensor observation meet the condition for segmentation.

For example, the segmentation module 1120 may perform segmentation 1123 on the sensing data. In performing segmentation, the segmentation module 1120 may determine a start time and an end time of the segmentation, and may output sensing data segmented by the start time and end time.

According to an embodiment, the segmentation module 1120 may detect a change in signal while observing the sensing data in real time, and provide it to the feature operation module 1130. The segmentation module 1120 may detect a signal change according to a gesture. The segmentation module 1120 may refrain from providing the sensing data resultant from routine motions, not gestures, to a post-processing module, e.g., the feature operation module 1130. Providing sensing data resultant from routine motions to the post-processing module may increase resource waste. Accordingly, the segmentation module 1120 needs to perform segmentation by detecting a change in sensing data similar to a gesture.

According to an embodiment, the feature operation module 1130 may receive the segmented sensing data from the segmentation module 1120. The feature operation module 1130 may perform feature extraction 1131 on the segmented sensing data. When a set of gestures provided to the user is fixed, features determined to be effective for each sensor may be previously selected from existing learned data, and corresponding features may be extracted. For example, a feature based on a fast Fourier transform (FFT) coefficient associated with a PPG signal may be used to distinguish between gestures, but a feature based on an FFT coefficient associated with an acceleration y-axis signal may be higher in accuracy. Accordingly, a feature list may be preselected for each sensor, and calculation may be performed only on the features included in the feature list. When a gesture set is not fixed, training may be previously performed, so that it may be impossible to select features. In this case, the feature operation module 1130 may identify a feature different from other existing learned features. When the feature operation module 1130 performs learning, specific features may be different from person to person. Selection of these features may be performed by the feature operation module 1130. The feature operation module 1130 may extract a feature from the sensing data and provide it to the classifier module 1140.

According to an embodiment, the classifier module 1140 may classify gestures based on the feature received from the feature operation module 1130. For example, the classifier module 1140 may classify gestures based on a learning-based model 1141. The learning-based model may receive features as input values and output gestures. The learning-based model may be generated based on a massive database and may be updated. Alternatively, the classifier module 1140 may classify gestures based on another gesture decision algorithm 1142 (e.g., a rule-based algorithm) It will be understood by those skilled in the art that the model (or algorithm) for recognizing gestures is not limited to a specific one. Additional training may be performed by the electronic device 101 or the model may be updated by additional training from an external electronic device.

When receiving an input other than the already learned gesture, the classifier module 1140 may also process the gesture. When it is determined that specific data (e.g., a linear z-axis acceleration value) among the sensing data is ineffective, the classifier module 1140 may classify the gesture without the feature corresponding to the data. Accordingly, the classifier module 1140 may perform gesture recognition using a learning-based model 1141 without sensing data whose effectiveness may not be guaranteed. The classifier module 1140 may recognize a gesture by inputting the feature received from the feature operation module 1130 using a model which is based on sensing data guaranteed for its effectiveness.

Figure 12:
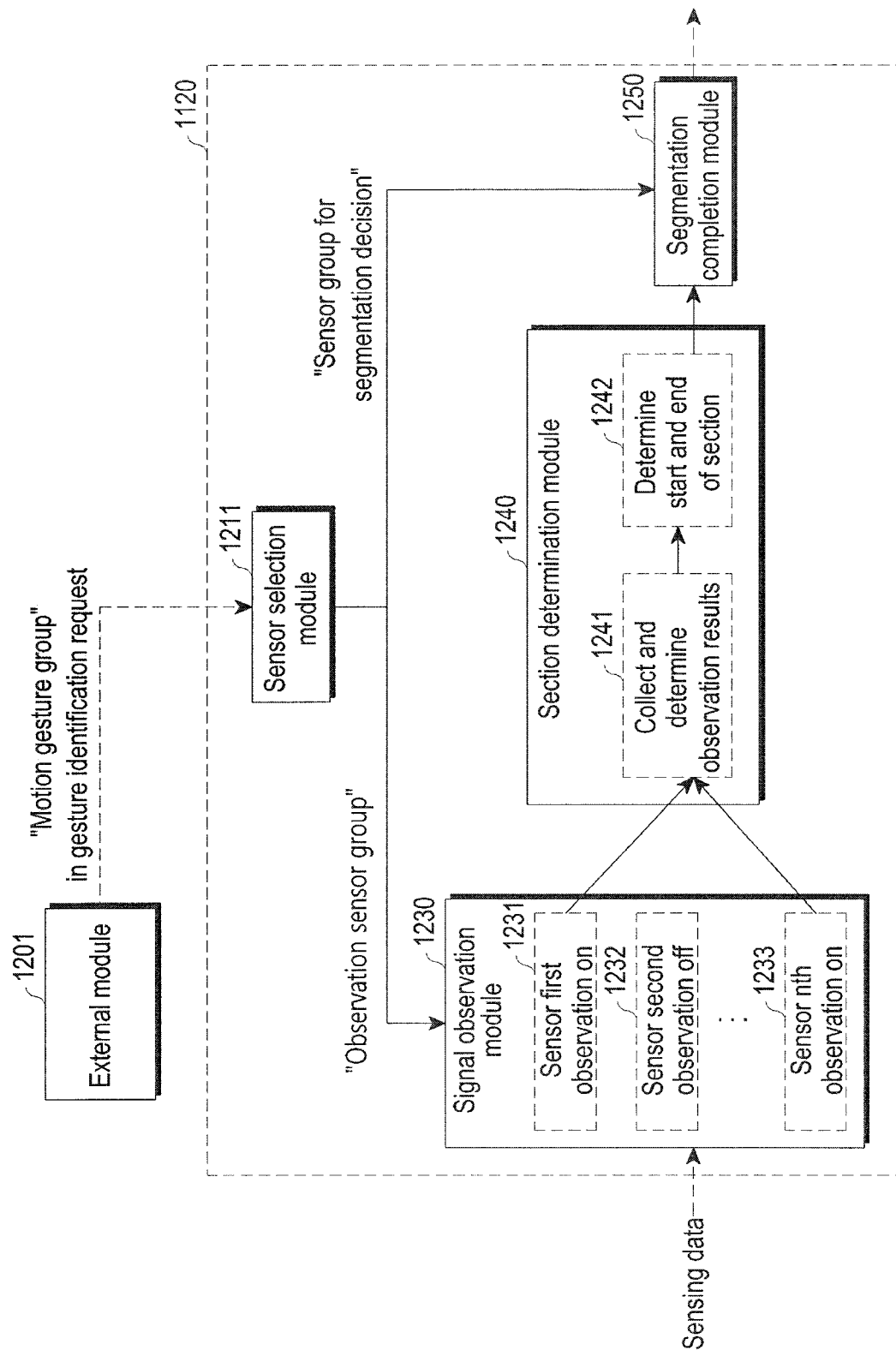
FIG. 12 is a view illustrating operations of a segmentation module of an electronic device according to an embodiment of the disclosure.

FIG. 12 is a view illustrating operations of a segmentation module of an electronic device according to an embodiment of the disclosure.

Referring to FIG. 12, the segmentation module 1120 may include a sensor selection module 1211, a signal observation module 1230, a section determination module 1240, and a segmentation completion module 1250. The sensor selection module 1211, the signal observation module 1230, the section determination module 1240, and the segmentation completion module 1250 may be programs (or applications or algorithms) executed by at least one of the processor 540 of FIG. 5, the auxiliary processor 720 of FIG. 7, or the processor 810 or auxiliary processor 820 of FIG. 8. Alternatively, the sensor selection module 1211, the signal observation module 1230, the section determination module 1240, and the segmentation completion module 1250 may be included in at least one of the processor 540, the auxiliary processor 720, or the auxiliary processor 820 or may be implemented in hardware which is disposed independently from the processor 540, the auxiliary processor 720, or the auxiliary processor 820.

According to an embodiment, the sensor selection module 1211 may identify a motion gesture group included in the gesture recognition request from the external module 1201. The motion gesture group may include information for gestures executable by the application providing the gesture recognition request. For example, the motion gesture group may include at least one of an OCO gesture, a shake gesture, or an environment detection. The sensor selection module 1211 may select an observation sensor group based on the information for gestures included in the motion gesture group. The observation sensor group may indicate sensors for sensing the information for gestures included in the motion gesture group. A gesture recognition function may support various gestures, and a different gesture group may be used per scenario or per application. Thus, only sensors corresponding to effective gestures for the gesture recognition request may be used, so that segmentation may be efficiently performed. Table 2 shows example correlation information between gesture and used sensing data.

TABLE 2

| Sensing data | OCO gesture | shake gesture | environment detection |
|---|---|---|---|
| PPG | ○ | | |
| GYRX | ○ | ○ | |
| GYRY | ○ | | ○ |
| GYRZ | | | ○ |
| GYRM | | | ○ |
| LACCX | | | ○ |
| LACCY | | | ○ |
| LACCZ | | | ○ |
| LACCM | | | |

In the OCO gesture, the PPG sensor may detect a change due to the relaxation and contraction of blood vessels while the user closes and opens her hand, and the gyro sensor may detect changes in X axis and Y axis due to the contraction of the wrist muscles while making a fist. Accordingly, the sensing data of PPG, GYRX, and GYRY may be used for OCO gesture recognition. In the shake gesture, the GRYX signal may be significantly changed because the wrist itself is shaken around the arm. Accordingly, the sensing data of GYRX may be used to recognize the shake gesture. Since a significant difference in signal change is made between the OCO gesture and the shake gesture, the two gestures may have different thresholds for segmentation. Alternatively, the minimum value of the thresholds may be set as a common threshold.

For example, in the embodiment of FIG. 12, an OCO gesture may be included in the motion gesture group of the gesture recognition request received from the external module 1201. The sensor selection module 1211 may identify sensing data (e.g., the sensing data of PPG, GYRX, and GYRY) required for OCO gesture recognition based on the information illustrated in Table 2. The sensor selection module 1211 may provide an observation sensor group indicating this to the signal observation module 1230.

According to an embodiment, the sensor selection module 1211 may select a sensor group for segmentation decision. The sensor group for segmentation decision may indicate sensors for obtaining sensing data used to finally determine whether to complete segmentation. For example, a sensor group for segmentation decision indicating the sensing data of {GYRY, GYRZ, GYRM, LACCX, LACCY, LACCZ} as illustrated in Table 2 may be provided to the segmentation completion module 1250. The sensor selected as the observation sensor group and the sensor selected as the sensor group for segmentation decision may perform sensing in at least a portion of the same time interval.

According to an embodiment, the signal observation module 1230 may observe sensing data from sensors corresponding to the observation sensor group selected by the sensor selection module 1211. If a first sensor and an nth sensor are determined as targets for observation by the observation sensor group, and a second sensor is not determined as a target for observation, the signal observation module 1230 may turn on the observation state for the first sensor (1231), turn on the observation state for the nth sensor (1233), and turn off the observation state for the second sensor (1232). Accordingly, the signal observation module 1230 may receive the sensing data from the first sensor and the nth sensor, but may not observe the sensing data from the second sensor. The second sensor may not be activated. For example, when the sensing data of PPG, GYRX, and GYRY is designated by the observation sensor group, the signal observation module 1230 may be configured to receive sensing data from the PPG sensor and the gyro sensor and not to receive sensing data from the remaining sensors.

According to an embodiment, the signal observation module 1230 may generate summation data corresponding to the observed sensing data. The signal observation module 1230 may generate the summation data based on Equation 1, for example.

$$X_i = \sum_{k=i-L}^{i} x_k^2 \qquad \text{Equation 1}$$

Where $X_i$ may be the summation data corresponding to the ith index. The index is a number for specifying a predetermined time interval (e.g., a sample section with a predetermined sampling size) and may increase according to a time-series flow. $x_i$ may be the sensing data, e.g., the sample signal value, corresponding to the ith index. L may be the length of section (e.g., the length of section 1011 in FIG. 10) for the summation data. According to Equation 1, the sensing data corresponding to the ith index may be the sum of the squares of sample signal values of the L indexes before the ith index. Use of the summation data may suppress noise. Instantaneous changes in the sensing data caused by a tiny motion may be noise, which may be suppressed in the summation data. Further, periodic signal waveforms may be processed as flat in the summation data. For example, a value according to the heartbeat cycle in the PPG sensing data or GYR sensing data according to the step length in walking may have a periodic waveform. Sensing data appearing with periodicity in the background may be processed as flat in processing the summation data.

According to an embodiment, the signal observation module 1230 may determine whether to start segmentation using the summation data. For example, the signal observation module 1230 may determine whether to perform segmentation using a ratio of the summation data of the current time to the summation data of the previous time. If the user wears the electronic device 101 and maintains relatively small motion, the ratio of the summation data of the current time to the summation data of the previous time may be identified as close to 1. When the user wears the electronic device 101 and makes a relatively large motion, the ratio of the summation data of the current time to the summation data of the previous time will increase to a value larger than 1 If the ratio exceeds a predetermined value, the signal observation module 1230 may determine to start segmentation. The corresponding ratio may physically mean the signal to interference and noise Ratio (SINR). Routine motions and/or noises other than gestures may change depending on the user's characteristics and use environments. When determining whether a gesture occurs, more accuracy may be achieved when using a relative ratio, rather than the absolute value of the summation data, as a reference. The signal observation module 1230 may determine an end time of segmentation. For example, the signal observation module 1230 may request the segment determination module 1240 to stop segmentation based on the summation data. For example, when the summation data is less than or equal to a designated value, or when the ratio of the summation data of the current time to the summation data of the previous time is less than or equal to a specific value, the signal observation module 1230 may request to stop the segmentation, but triggers for stopping segmentation are not limited to a specific one.

According to an embodiment, upon determining to start segmentation, the signal observation module 1230 may provide the summation data to the section determination module 1240. The section determination module 1240 may determine a start point and an end point of the gesture signal section. The section determination module 1240 may comprehensively determine the results of observation from the sensors when multi-sensor observation is used to increase the accuracy of section determination. For example, in operation 1241, the section determination module 1240 may collect the results of observation and determine a segmentation section based on the collected results. In operation 1242, the section determination module 1240 may determine the start and end points of the segmentation section. The section determination module 1240 may determine an end point based on the summation data received from the signal observation module 1230. For example, the moment when the SINR becomes smaller than a specific threshold may be determined as out of the gesture signal section, and the sample, a designated time before the corresponding time point, may be determined as the end point. According to an embodiment, the section determination module 1240 may perform fine-tuning to finely adjust the start point and the end point. The start time determined by the signal observation module 1230 means the first point where the cumulated signal energy graph increases, and this point may be different from the start point of the actual gesture signal. The section determination module 1240 may determine a section where the frequency of the summation data is high in the range between the start point and the end point determined by the signal observation module 1230. For example, the section determination module 1240 may perform fine-tuning by determining a section exceeding a specific ratio with respect to the maximum value within the section.

According to an embodiment, the section determination module 1240 may determine a designated length from the start point as the segmentation section. The designated length may be set to a length sufficient to include one gesture signal. In this case, the end point may be determined as a point after a designated length from the start point determined by the signal observation module 1230. According to an embodiment, the section determining module 1240 may directly use the segmentation section or may additionally perform fine-tuning. For example, the section determination module 1240 may perform fine-tuning in such a manner as to reselect a point, where the summation data becomes the maximum, as the end point while moving a number of samples before/after the determined end point.

According to an embodiment, the segmentation completion module 1250 may identify whether the segmentation section received from the section determination module 1240 is effective and, if effective, transmit the segmentation section to the feature operation module 1130. For example, the segmentation completion module 1250 may receive a sensor group for segmentation decision from the sensor selection module 1211. The segmentation completion module 1250 may observe sensing data based on the received sensor group for segmentation decision. In the example of Table 2, the sensing data of {GYRY, GYRZ, GYRM, LACCX, LACCY, LACCZ} may be set as sensing data for segmentation decision. The segmentation completion module 1250 may determine whether to segment based on the sensing data of {GYRY, GYRZ, GYRM, LACCX, LACCY, LACCZ}. The segmentation completion module 1250 may determine whether to finally output the segmentation section based on the set sensing data. As an example, when the user makes a specific gesture while shaking her arm, since the arm shaking motion is larger than the gesture, segmentation may be performed. However, there is a high chance of failure in gesture recognition for the corresponding segmentation. Accordingly, the segmentation completion module 1250 may not output the segmentation section when it is determined that a failure in gesture recognition is highly likely.

Figure 13A:
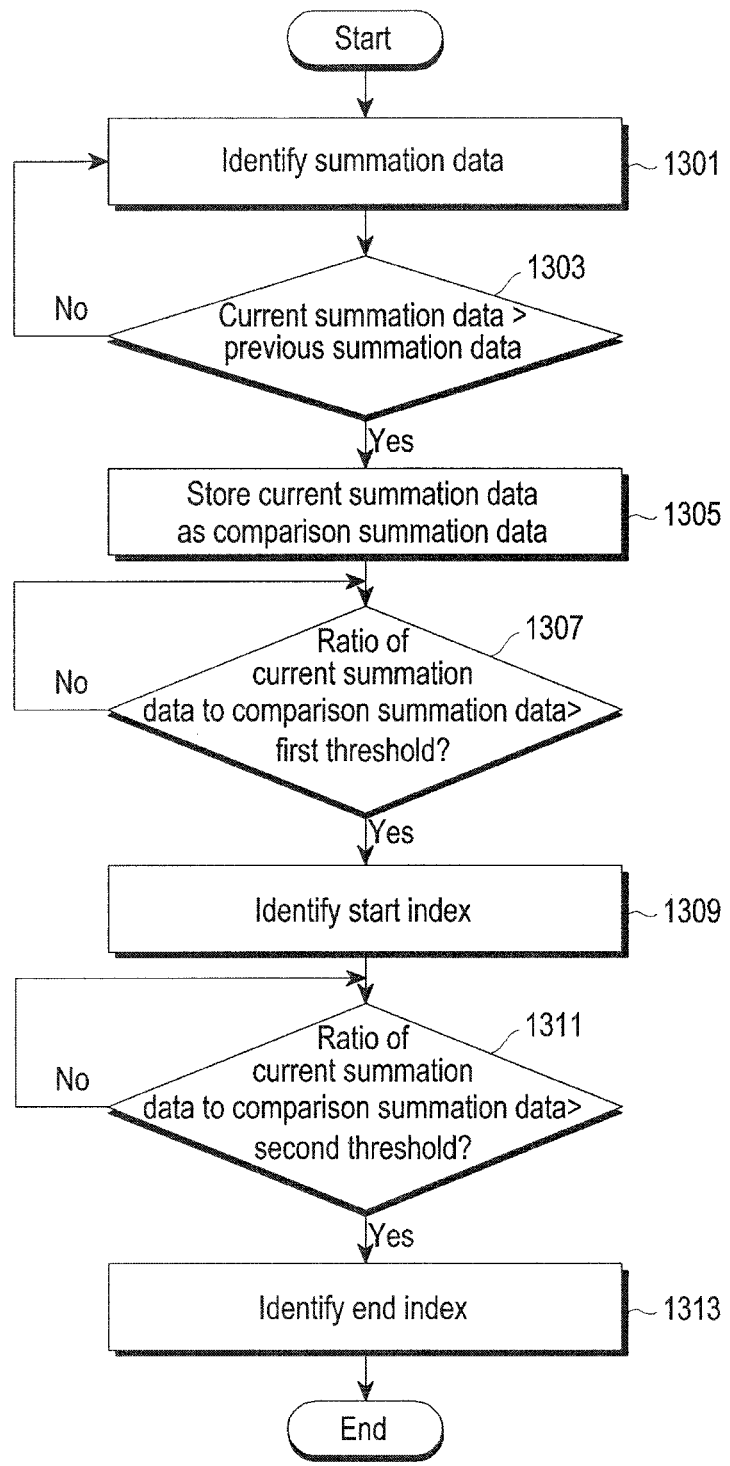
FIG. 13A is a flowchart illustrating a method for operating an electronic device according to an embodiment of the disclosure.

FIG. 13A is a flowchart illustrating a method for operating an electronic device according to an embodiment of the disclosure.

Referring to FIG. 13A, an electronic device 101 (e.g., at least one of the processor 540 of FIG. 5, the processor 710 or the auxiliary processor 720 of FIG. 7, or the processor 810 or the auxiliary processor 820 of FIG. 8) may identify summation data in operation 1301. In operation 1303, the electronic device 101 may determine whether the current summation data is larger than the previous summation data. For example, the electronic device 101 may measure the sensing data $x_i$ corresponding to the ith index. For example, the electronic device 101 may identify the summation data $X_i$ for the length of section (e.g., the length of section 1011 of FIG. 10) for the ith index, based on Equation 1. The electronic device 101 is assumed to identify the summation data $X_{i-1}$ for the i–1th index. The electronic device 101 may determine whether the summation data $X_i$ for the ith index is larger than the summation data $X_{i-1}$ for the i–1th index. Unless the summation data $X_i$ for the ith index is larger than the summation data $X_{i-1}$ for the i–1th index (no in 1303), the electronic device may continuously identify the summation data. As operation 1303 and operation 1301 are iterated, the index may be increased by 1. The operation of determining whether the current summation data is larger than the previous summation data may be referred to as first observation.

According to an embodiment, if the summation data ($X_i$) for the ith index is larger than the summation data ($X_{i-1}$) for the i–1th index (yes in 1303), the electronic device 101 may store the current summation data as comparison data (X') in operation 1305. In operation 1307, the electronic device 101 may determine whether a ratio of the current summation data to the comparison data exceeds a first threshold. Unless the ratio of the current summation data to the comparison data exceeds the first threshold (no in 1307) in operation 1309, the electronic device 101 may repeat the operation of determining whether the ratio exceeds the first threshold, and during the repetition, the index may be increased by 1. In another embodiment, the electronic device 101 may be configured to immediately increase the index by 1 after storing the current summation data as comparison data in operation 1305 and then perform operation 1307. If the ratio of the current summation data to the comparison data exceeds the first threshold (yes in 1307), the electronic device 101 may identify the index at the time point as the start index. Although not shown, the electronic device 101 may stop the entire operation when it is identified that a predetermined time elapses (or the index is increased a predetermined number of times) in operation 1307. Alternatively, the electronic device 101 may stop the entire operation based on identifying the termination of the application. The operation of determining whether the ratio of the current summation data to the comparison data exceeds the first threshold may be referred to as second observation. The first threshold may be set to, e.g., 3, but is not limited thereto.

According to an embodiment, when the start index is identified, the electronic device 101 may detect the end index. For example, in operation 1311, the electronic device 101 may determine whether the ratio of the current summation data to the comparison data is less than a second threshold. Unless the ratio of the current summation data to the comparison data is less than the second threshold (no in 1311), the electronic device 101 may repeat the operation of determining whether the ratio is less than the second threshold, and during the repetition, the index may be increased by 1. If the ratio of the current summation data to the comparison data is less than the second threshold (yes in 1311), the electronic device 101 may identify the index as the end index in operation 1313. Based on the above-described operations, the electronic device 101 may identify the start index and the end index of the segmentation section. According to an embodiment, the electronic device 101 may update the comparison data at a designated cycle.

Figure 13B:
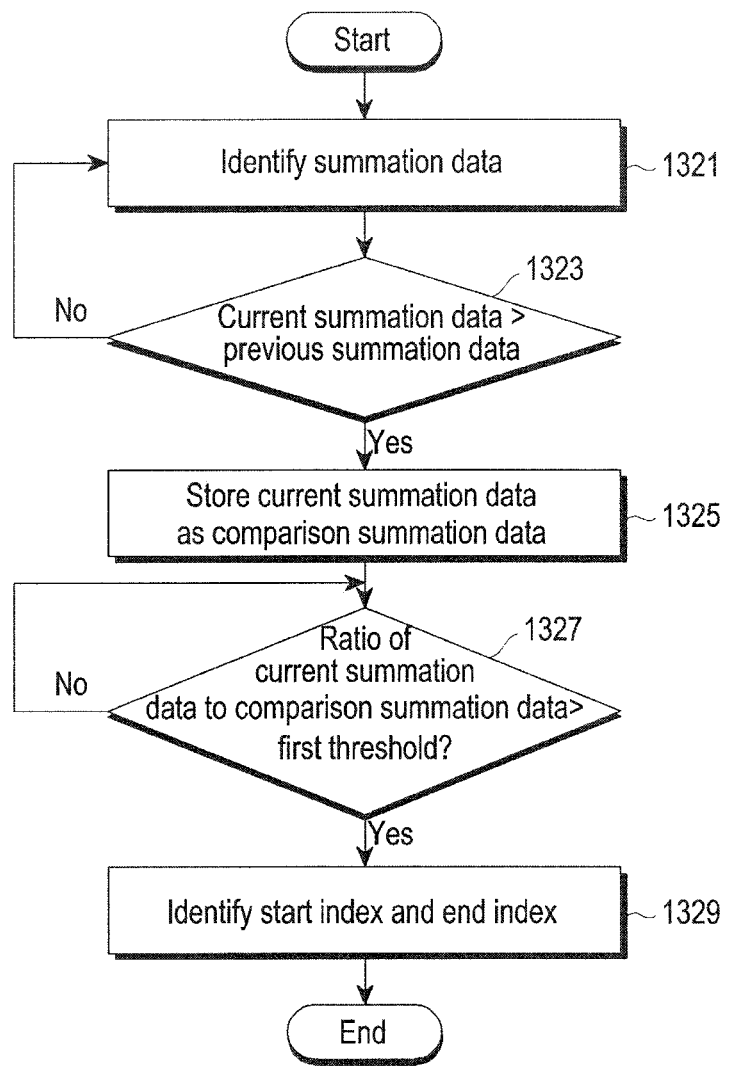
FIG. 13B is a flowchart illustrating a method for operating an electronic device according to an embodiment of the disclosure.

FIG. 13B is a flowchart illustrating a method for operating an electronic device according to an embodiment of the disclosure. Referring to FIG. 13B, operations 1321, 1323, 1325, and 1327 may be substantially the same as operations 1301, 1303, 1305, and 1307, respectively, of FIG. 13A, and no description thereof is given below. If the ratio of the current summation data to the comparison data exceeds the first threshold (yes in 1327), the electronic device 101 (e.g., at least one of the processor 540 of FIG. 5, the processor 710 or the auxiliary processor 720 of FIG. 7, or the processor 810 or the auxiliary processor 820 of FIG. 8) may identify the start index and the end index in operation 1329. The electronic device 101 may identify the index where the ratio exceeds the first threshold as the start index.

Further, the electronic device 101 may identify the end index by adding a designated number of indexes to the start index. This may mean that the segmentation section is determined by adding a designated length immediately when the start index is identified. The designated number of indexes may be set corresponding to a sufficient time for gesture recognition. For example, when the designated number is a number corresponding to 3 seconds, an index after the number corresponding to 3 seconds from the start index may be identified as the end index. The designated number is not limited thereto and may be changed. Although not shown, after identifying the end index, the electronic device 101 may additionally perform fine-tuning as described above.

Figure 14:
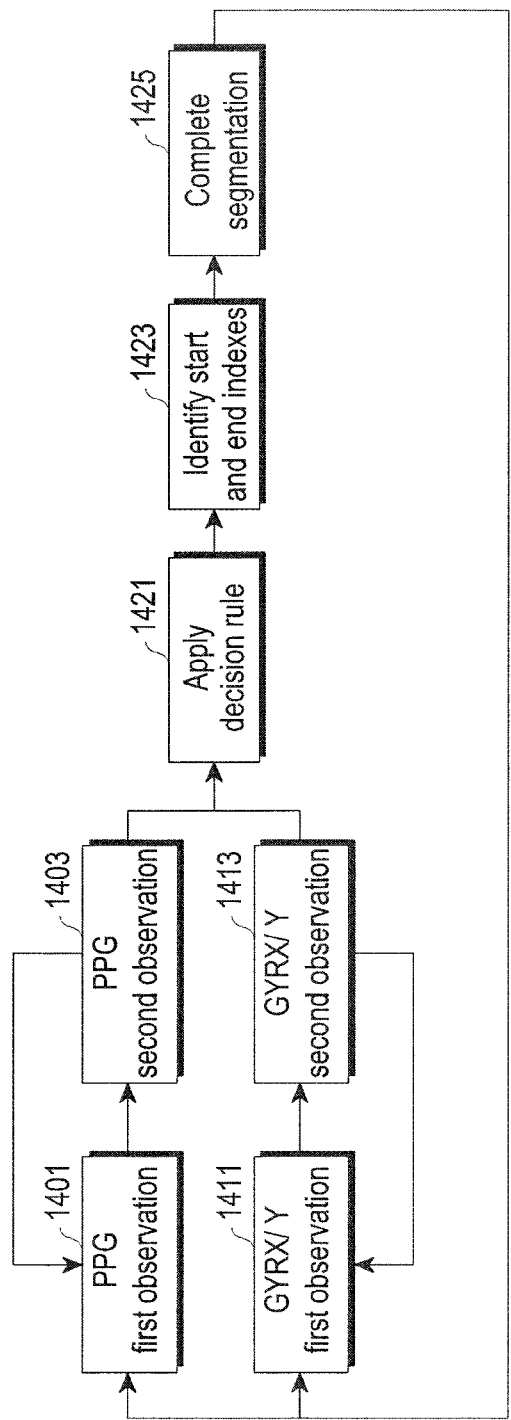
FIG. 14 is a view illustrating a decision rule for a plurality of types of sensing data according to an embodiment of the disclosure.

FIG. 14 is a view illustrating a decision rule for a plurality of types of sensing data according to an embodiment of the disclosure.

Referring to FIG. 14, an electronic device 101 (e.g., at least one of the processor 540 of FIG. 5, the processor 710 or the auxiliary processor 720 of FIG. 7, or the processor 810 or the auxiliary processor 820 of FIG. 8) may obtain a plurality of types of sensing data. For example, the electronic device 101 may obtain GYRX/Y sensing data while obtaining PPG sensing data. The electronic device 101 may perform PPG first observation in operation 1401. The electronic device 101 may perform GYRX/Y first observation in operation 1411. As described above, the first observation may include an operation for determining whether the current summation data is larger than the previous summation data. The electronic device 101 may perform PPG second observation in operation 1403. The electronic device 101 may perform GYRX/Y second observation in operation 1413. As described above, the second observation may include an operation for determining whether a ratio between the current summation data to comparison summation data exceeds a designated threshold. The second observation may be performed when the first observation is successful. A segmentation period may be determined according to a result of the second observation.

According to an embodiment, the electronic device 101 may apply a decision rule in operation 1421. In one example, the electronic device 101 may apply a soft decision rule. In a case where the soft decision rule is applied, the electronic device 101 may perform segmentation when a segmentation section is determined from any one of the plurality of types of sensing data. In another example, the electronic device 101 may apply a hard decision rule. In a case where the hard decision rule is applied, the electronic device 101 may perform segmentation when a segmentation section is determined from all of the plurality of types of sensing data being observed. When the soft decision rule is set, segmentation robust to noise and interference may be possible. For example, the soft decision rule may be advantageous if the user makes an OCO gesture while walking swinging arms. When observing sensing data from the PPG sensor and the gyro sensor, which are sensors effective for the OCO gesture, the swing of the user's arms other than the OCO gesture may be measured as noise and/or interference. If the soft decision rule is applied, the electronic device 101 may perform segmentation by detecting the OCO gesture only with the SINR of the PPG sensing data. The soft decision rule is highly likely to perform robust segmentation even under the influence of the external environment. When the hard decision rule is set, the possibility of segmentation by other routine motions other than a preset gesture may be reduced. When the preset gesture is clearly distinguished from the routine motion, it may be advantageous to apply the hard decision rule. For example, a gesture which is a combination of relatively complex motions requires high accuracy as to whether to start segmentation and, in this case, the hard decision rule may be more advantageous. According to an embodiment, operation 1421 of applying the decision rule may be performed before the operation of obtaining the plurality of types of sensing data. For example, when a sensor to obtain sensing data is determined or a gesture to be detected is set, the decision rule may be applied and a plurality of types of sensing data may then be obtained.

In operation 1423, the electronic device 101 may identify the start index and the end index. In one example, the electronic device 101 may select a start index and an end index based on a main sensor among a plurality of sensors. In another example, the electronic device 101 may select a start index and an end index for the sensing data for which the start index has first been detected among the plurality of sensors. As another example, the electronic device 101 may identify a segmentation section for each of a plurality of pieces of sensing data or may determine a segmentation section that may include all of the plurality of segmentation sections. In operation 1425, the electronic device 101 may complete the segmentation.

Figure 15:
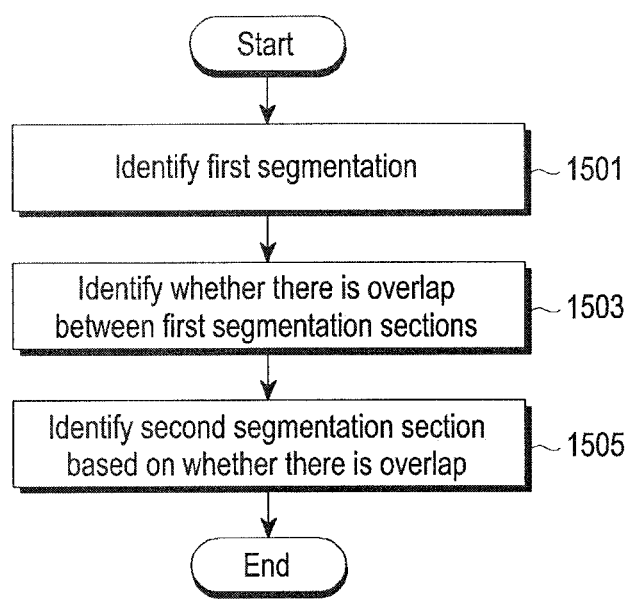
FIG. 15 is a flowchart illustrating a method for operating an electronic device according to an embodiment of the disclosure.
Figure 16:
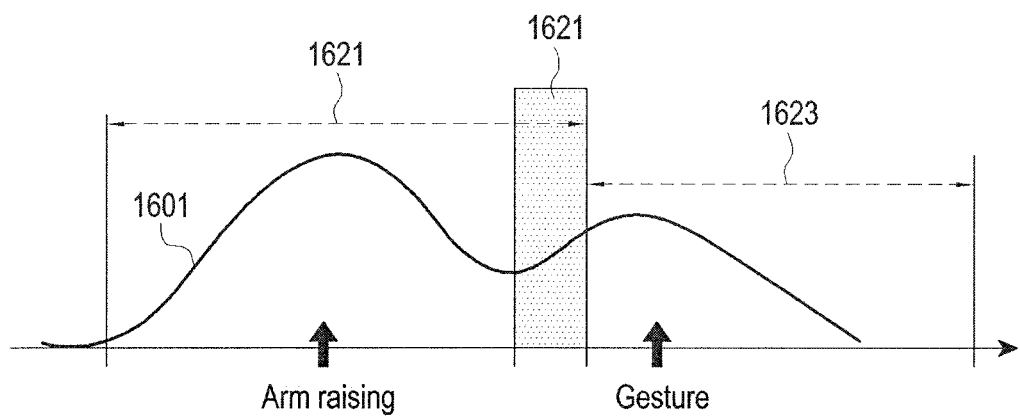
FIG. 16 is a view illustrating an overlap between segmentation sections according to an embodiment of the disclosure.
Figure 16:
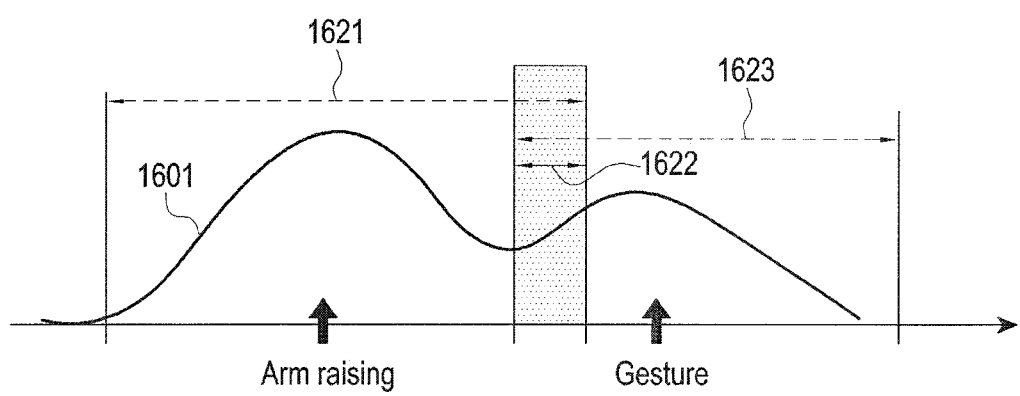

FIG. 15 is a flowchart illustrating a method for operating an electronic device according to an embodiment of the disclosure. The embodiment of FIG. 15 is described with reference to FIG. 16. FIG. 16 is a view illustrating an overlap between segmentation periods according to an embodiment of the disclosure.

According to an embodiment, an electronic device 101 (e.g., at least one of the processor 540 of FIG. 5, the processor 710 or the auxiliary processor 720 of FIG. 7, or the processor 810 or the auxiliary processor 820 of FIG. 8) may identify a first segmentation section in operation 1501. In operation 1503, the electronic device 101 may identify whether the first segmentation section has an overlap. For example, when the user wears a wrist watch-type electronic device 101, a call may be received. In this case, the user may raise the arm wearing the electronic device 101 before performing a shake gesture, and may perform a shake gesture after raising the arm. Referring to (a) of FIG. 16, the electronic device 101 may identify the summation data 1601 corresponding to the sensing data. Segmentation may also be performed according to the user's arm raising motion. For example, a first segmentation section 1621 of FIG. 16 may be identified. Thereafter, a second segmentation section 1623 resultant from the shake gesture may be required to be segmented. However, as illustrated in (a) of FIG. 16, the user's arm raising motion and the shake gesture may overlap in the overlapping section 1622. If the second segmentation section 1623 except for the overlapping section 1622 is determined, a part of the signal resultant from the shake gesture may be lost, so that the recognition rate may decrease. Accordingly, the electronic device 101 may determine whether there is an overlap between segmentation sections. In operation 1505, the electronic device 101 may identify the second segmentation section based on whether there is an overlap. If it is determined to allow an overlap, the electronic device 101 may determine that the overlapping section 1622 is included in both the first segmentation section 1621 and the second segmentation section 1623. For example, as illustrated in (b) of FIG. 16, the electronic device 101 may determine whether there is an overlap and the overlapping section 1622 based on the result of determination by the segmentation completion module 1250 described above in connection with FIG. 12. In one example, the arm raising motion may be determined according to a degree of change in sensing data from the gyro sensor and the linear acceleration sensor. When the waveform of the sensing data detected by the gyro sensor has a concave shape or a convex shape, it may be determined as an arm raising motion. The electronic device 101 may determine to allow an overlap if identifying a concave or convex waveform of sensing data from the gyro sensor, whose magnitude is larger than or equal to a threshold set for identifying an arm raising motion. For example, the electronic device 101 may set the second segmentation section from the point when the arm raising operation is identified to be completed, or from a point, a preset time before the point of completion of the arm raising motion.

Figure 17:
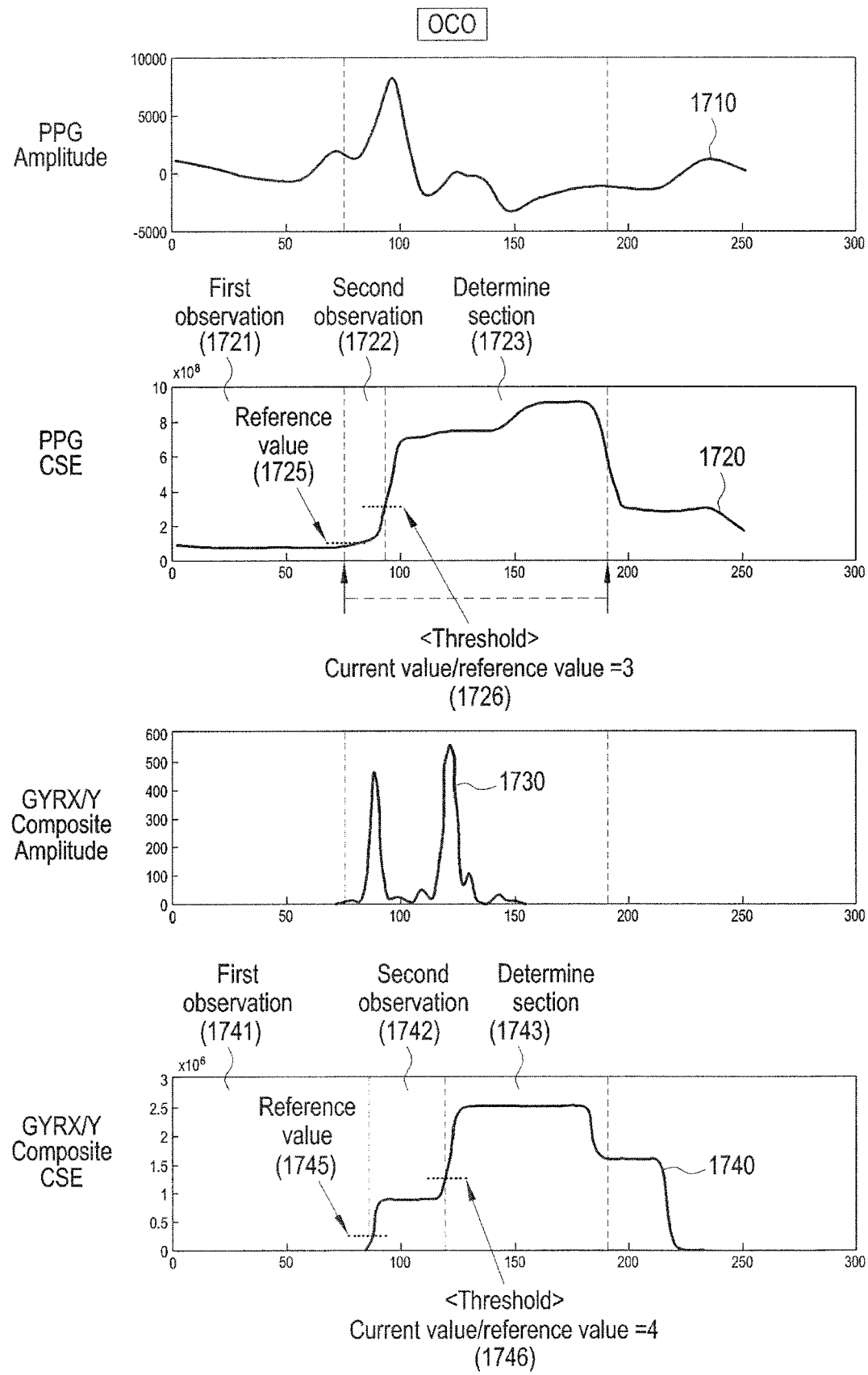
FIG. 17 is a view illustrating waveforms for describing sensing data and summation data according to an embodiment of the disclosure.

FIG. 17 is a view illustrating waveforms for describing sensing data and summation data according to an embodiment of the disclosure.

According to an embodiment, an electronic device 101 (e.g., at least one of the processor 540 of FIG. 5, the processor 710 or auxiliary processor 720 of FIG. 7, or the processor 810 or auxiliary processor 820 of FIG. 8) may sense the first sensing data 1710 of the PPG amplitude and the second sensing data 1730 of the GYRX/Y composite amplitude. The electronic device 101 may generate the first summation data 1720 based on the first sensing data 1710, and may generate the second summation data 1740 based on the second sensing data 1730. The electronic device 101 may perform first observation 1721 on the first summation data 1720 and may perform first observation 1741 on the second summation data 1740. The first observations 1721 and 1741 may include an operation for determining whether the current summation data is larger than the previous summation data. If it is determined that the current summation data is larger than the previous summation data according to the result of the first observation 1721, the electronic device 101 may perform second observation 1722 on the first summation data 1720. The electronic device 101 may set the current summation data, which is larger than the previous summation data, as a reference value 1725 according to the result of the first observation 1721 on the first summation data 1720. As the second observation 1722, the electronic device 101 may determine whether the ratio of the current summation data to the reference value 1725 exceeds a threshold 1726 (e.g., 3). When the ratio of the current summation data to the reference value 1725 exceeds the threshold 1726 (e.g., 3), the electronic device 101 may perform section determination 1723. According to an embodiment, the electronic device 101 may determine a segmentation section in such a manner as to add a designated length of time from the start point for the section determination 1723, but determination of a segmentation section is not limited thereto. The electronic device 101 may set the current summation data, which is larger than the previous summation data, as a reference value 1745 according to the result of the first observation 1741 on the second summation data 1740. As the second observation 1742, the electronic device 101 may determine whether the ratio of the current summation data to the reference value 1745 exceeds a threshold 1746 (e.g., 4). The thresholds 1726 and 1746 may be set to differ for the types of sensing data, but this is merely an example, and the thresholds may be the same. If the thresholds 1726 and 1746 are set to be too small, segmentation may be performed even with a slight motion, or if set to be too large, when the sensing data resultant from a gesture is relatively small or there is interference due to an external motion, segmentation may not be performed. The thresholds 1726 and 1746 may be set experimentally considering such trade-off. When the ratio of the current summation data to the reference value 1745 exceeds the threshold 1746 (e.g., 4), the electronic device 101 may perform section determination 1743. If the section determination is not started within a designated time (e.g., 0.6 seconds) after starting the second observation 1722 or 1742, the electronic device 101 may start the first observation 1721 or 1741 again. Accordingly, the reference values 1725 and 1745 may also be updated. If the hard decision rule is applied, the electronic device 101 may perform segmentation based on identifying that the rule for section determination is met for both the first summation data 1720 and the second summation data 1740. In this case, the electronic device 101 may perform segmentation at the time when the second summation data 1740, which meets the rule later, meets the rule.

According to an embodiment, when the soft decision rule is applied, the electronic device 101 may perform segmentation if the second observation succeeds in either the first summation data 1720 or the second summation data 1740. For example, the electronic device 101 may perform segmentation at the time when the rule is met for the first summation data 1720 which meets the rule earlier than the second summation data. Since a responding sensor may differ depending on the state in which the electronic device 101 is worn or the strength of the gesture, the soft decision rule may apply. Referring to FIG. 17, the electronic device 101 may stop the second observation 1742 also for the second summation data 1740 and perform section determination 1743 based on the success in the second observation 1722 on the first summation data 1720. According to an embodiment, the electronic device 101 may determine a segmentation section in such a manner as to add a designated length of time (e.g., 1.2 seconds) from the start point for the section determination 1743, but determination of a segmentation section is not limited thereto. The designated length of time may be set to a length sufficient to collect sensing data corresponding to the gesture. As another example, the electronic device 101 may temporarily determine the segmentation end point by adding a designated length of time (e.g., 1.2 seconds) from the start point of the section determination 1743. According to an embodiment, the electronic device 101 may set the start point, the end point, and/or the length of section to be different or identical for each sensor (e.g., PPG or GYR). For example, some of the section determination 1723 and the start point, end point, and/or length of section of the section determination 1723 may be the same. When it is identified that the summation data decreases at the temporarily set end point, the electronic device 101 may confirm or finally determine the temporarily set end point. If it is identified that the summation data increases up to the temporarily set end point, the electronic device 101 may adjust the end point until the summation data decreases. The electronic device 101 may set a section from the first identified start point to the adjusted end point as the segmentation section or may reset a section before a designated length of time (e.g., 1.2 seconds) from the adjusted end point as the segmentation section. Thus, the section having relatively large sensing data may be more likely to be segmented. In particular, gesture recognition may be further enhanced when the user walks or runs.

Figure 18:
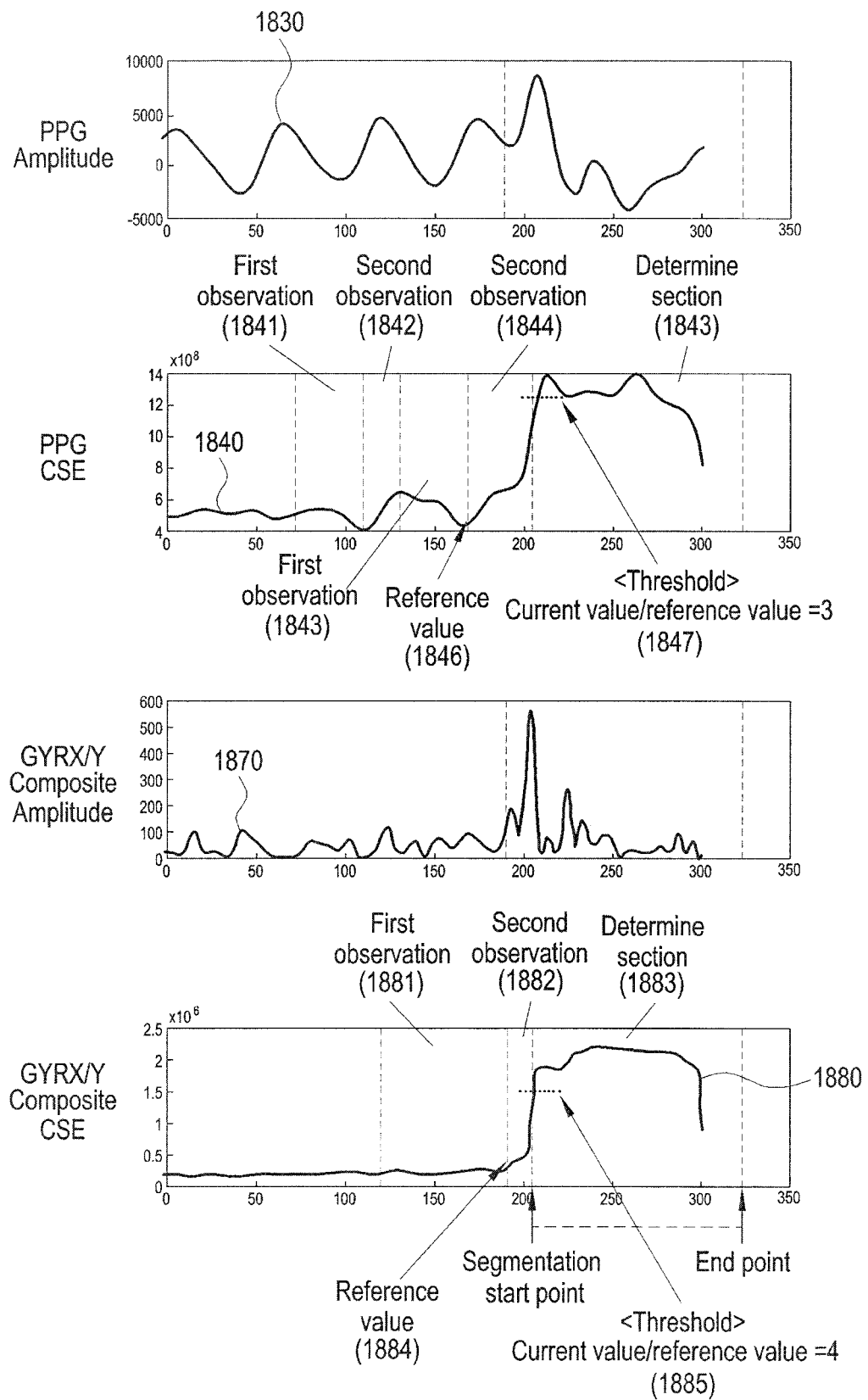
FIG. 18 is a view illustrating waveforms for describing sensing data and summation data according to an embodiment of the disclosure.

FIG. 18 is a view illustrating waveforms for describing sensing data and summation data according to an embodiment of the disclosure.

For example, it is hypothesized that the user with the electronic device 101 on her arm walks with no or little arm motion and makes a gesture (e.g., an OCO gesture). The electronic device 101 (e.g., at least one of the processor 540 of FIG. 5, the processor 710 or auxiliary processor 720 of FIG. 7, or the processor 810 or auxiliary processor 820 of FIG. 8) may sense the first sensing data 1830 of the PPG amplitude and the second sensing data 1870 of the GYRX/Y composite amplitude. Referring to FIG. 18, the first summation data 1830 and the second summation data 1870 have periodic peaks due to the user's steps.

According to an embodiment, the electronic device 101 may generate the first summation data 1840 based on the first sensing data 1830, and may generate the second summation data 1880 based on the second sensing data 1870. Referring to FIG. 18, it may be identified that the periodic peaks due to the user's steps are suppressed in the first summation data 1840 and the second summation data 1880. The electronic device 101 may perform a first observation 1841 and a second observation 1842 on the first summation data 1840. The electronic device 101 may re-perform the first observation 1843 based on the ratio not exceeding the threshold 1847 within a preset time after the second observation 1842 is performed. By the success in the first observation 1843, the electronic device 101 may perform the second observation 1844. As the second observation 1844 is performed, the electronic device 101 may update the reference value 1846. The electronic device 101 may perform a first observation 1881 and a second observation 1882 on the second summation data 1880. By the success in the first observation 1881, the electronic device 101 may set a reference value 1884. The electronic device 101 may perform the section determination 1883 based on the ratio of the current summation data for the second summation data 1880 to the reference value 1884 exceeding the threshold 1885 (e.g., 4). Accordingly, the electronic device 101 may also perform the section determination 1845 on the first summation data 1840. The electronic device 101 may identify the segmentation section. According to an embodiment, the electronic device 101 may perform section determination for the second sensor based on the section determination for the first sensor determined based on the sensing data from the first sensor and the summation data. For example, the electronic device 101 may also perform the section determination 1883 on the first summation data 1840 based on the section determination 1883 which is based on the ratio of the current summation data for the second summation data 1880 to the reference value 1884 exceeding the threshold 1885 (e.g., 4).

As described above, even when the SINR is relatively weak, such as when the user walks, use of the summation data renders it possible to perform accurate segmentation. In particular, it is possible to prevent segmentation from being performed by the user's footsteps.

Figure 19:
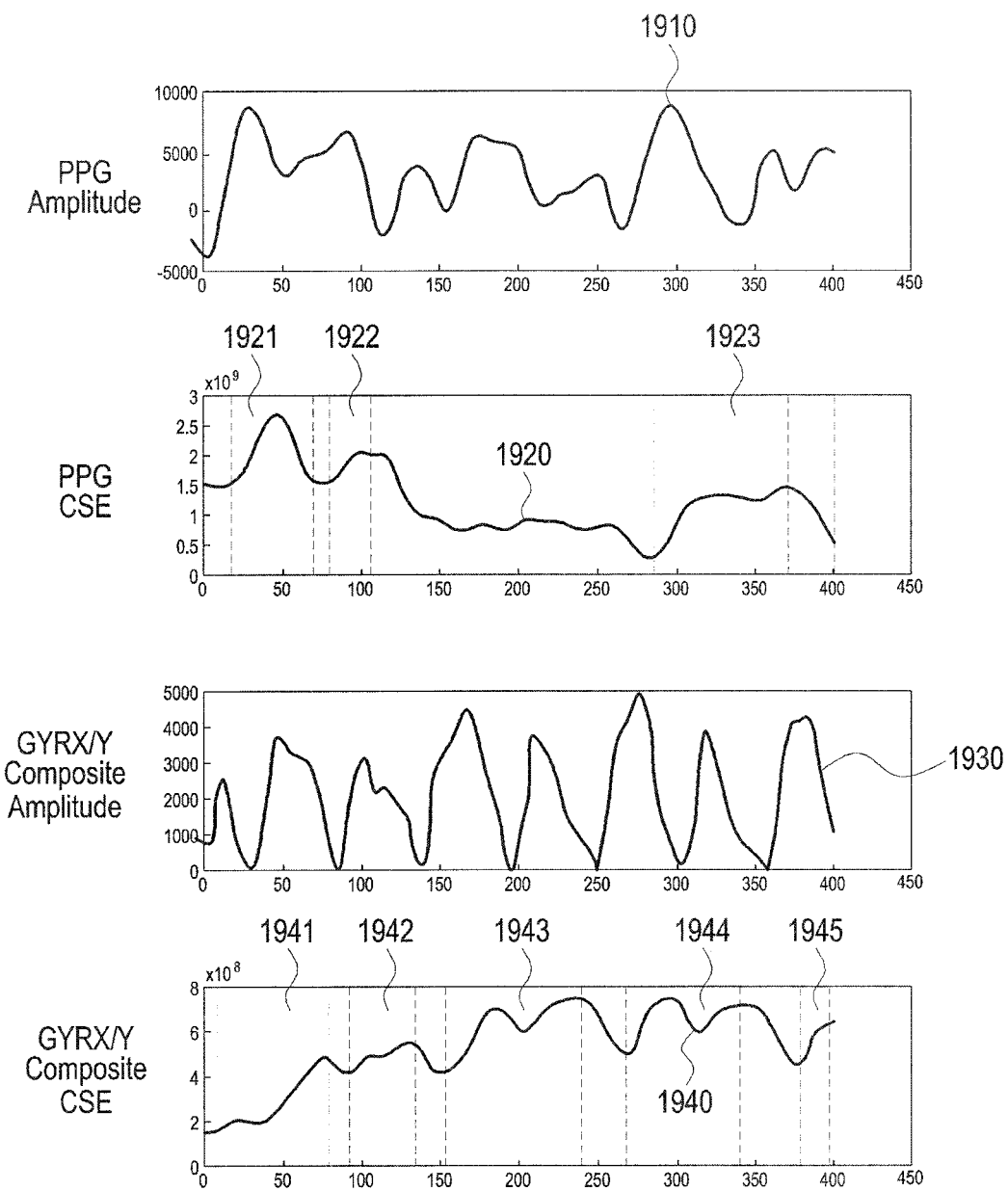
FIG. 19 is a view illustrating waveforms for describing sensing data and summation data according to an embodiment of the disclosure.

FIG. 19 is a view illustrating waveforms for describing sensing data and summation data according to an embodiment of the disclosure.

For example, it is hypothesized that the user walks swinging arms, with the electronic device 101 on her arm. The electronic device 101 (e.g., at least one of the processor 540 of FIG. 5, the processor 710 or auxiliary processor 720 of FIG. 7, or the processor 810 or auxiliary processor 820 of FIG. 8) may sense the first sensing data 1910 of the PPG amplitude and the second sensing data 1930 of the GYRX/Y composite amplitude. Referring to FIG. 19, it may be identified that variations in the amplitude of the first sensing data 1910 and the second sensing data 1930 are relatively large. According to an embodiment, the electronic device 101 may generate the first summation data 1920 based on the first sensing data 1910, and may generate the second summation data 1940 based on the second sensing data 1930. As illustrated in FIG. 19, it may be identified that a plurality of second observations 1921, 1922, and 1923 are performed on the first summation data 1920, and a plurality of second observations 1941, 1942, 1943, 1944, and 1945 are performed on the second summation data 1940, but section determination is not performed. This may be due to the fact that the variations in the summation data is suppressed compared with the variations in the sensing data. Further, since the reference value may be updated according to the failure in the second observations, segmentation may be suppressed from being performed. Accordingly, segmentation may be suppressed as compared with the comparative example in which a gesture is recognized based on the sensing data. Table 3 shows a comparison between when summation data is used according to an embodiment and when sensing data is used according to the comparative example, regarding how many times segmentation has been performed in unnecessary sections other than gesture sections in 6,630 experiments.

TABLE 3

|  | When sensing data is used | When summation data is used |
| --- | --- | --- |
| Number of times of unnecessary sensing data segmentation in 6,630 experiments | 5,238 | 2,286 |

Figure 20A:
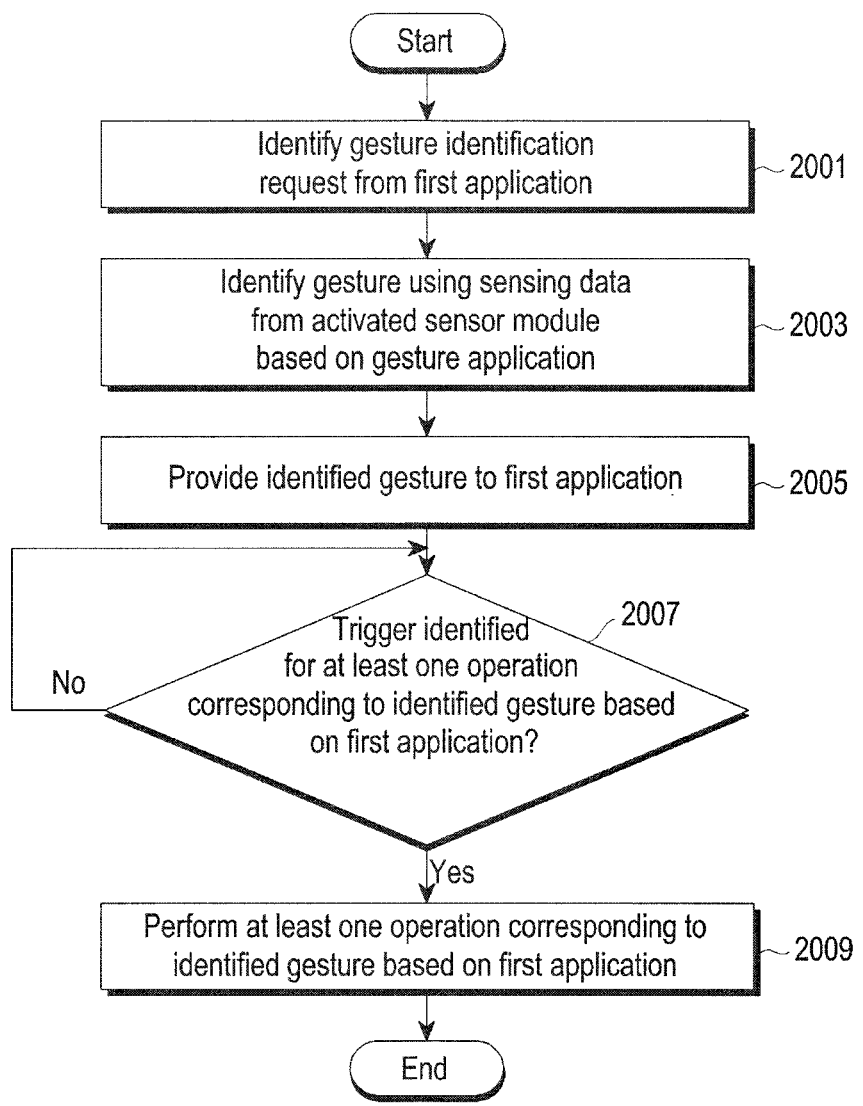
FIG. 20A is a flowchart illustrating a method for operating an electronic device according to an embodiment of the disclosure.
Figure 20B:
FIG. 20B is a view illustrating an electronic device according to an embodiment of the disclosure.

As described above, the frequency of unnecessary segmentation may be reduced when summation data is used. FIG. 20A is a flowchart illustrating a method for operating an electronic device according to an embodiment of the disclosure. FIG. 20A is described with reference to FIG. 20B. FIG. 20B is a view illustrating an electronic device according to an embodiment of the disclosure.

Referring to FIG. 20A, according to an embodiment, an electronic device 101 (e.g., at least one of the processor 540 of FIG. 5, the processor 710 or the auxiliary processor 720 of FIG. 7, or the processor 810 or the auxiliary processor 820 of FIG. 8) may identify a gesture identification request from a first application (e.g., a phone application) in operation 2001. According to an embodiment, the electronic device 101 may activate at least one sensor included in at least the sensor module based on the gesture identification request identified from the first application. In operation 2003, the electronic device 101 may identify the gesture using the sensing data from the activated sensor module based on the gesture application. In operation 2005, the electronic device 101 may provide the identified gesture to the first application. In operation 2007, the electronic device 101 may determine whether a trigger for at least one operation (e.g., accepting the call) corresponding to the identified gesture is identified based on the first application. For example, referring to FIG. 20B, the electronic device 101 may display a screen 2020. The screen 2020 may be a screen displayed on the display module (e.g., the display module 510 of FIG. 5) before the phone application accepts the call, which is an operation corresponding to the received gesture. The screen 2020 may include an icon 2021 for accepting the call and an icon 2022 for declining the call. The screen 2020 may also include the remaining time 2023 (e.g., 3 seconds) until the call can be accepted. The user may select the icon 2021 for accepting the call and, in response thereto, the electronic device 101 may directly receive the call. The selection of the icon 2021 for accepting the call may be a trigger for at least one operation. On the other hand, the user may select the icon 2022 for declining the call and, in response thereto, the electronic device 101 may not receive the call. Alternatively, the electronic device 101 may accept or decline the call after the remaining time 2023 expires. The expiration of the remaining time 2023 may be a trigger for at least one operation. In various examples, the trigger may be a gesture. For example, upon identifying that the same (or different) gesture is additionally detected, the electronic device 101 may identify that a trigger has occurred. When the trigger for at least one operation is identified (yes in 2007), the electronic device 101 may perform at least one operation corresponding to the identified gesture based on the first application in operation 2009. Accordingly, it is possible to prevent a corresponding operation from being performed by a gesture that is not intended by the user.

Figure 21A:
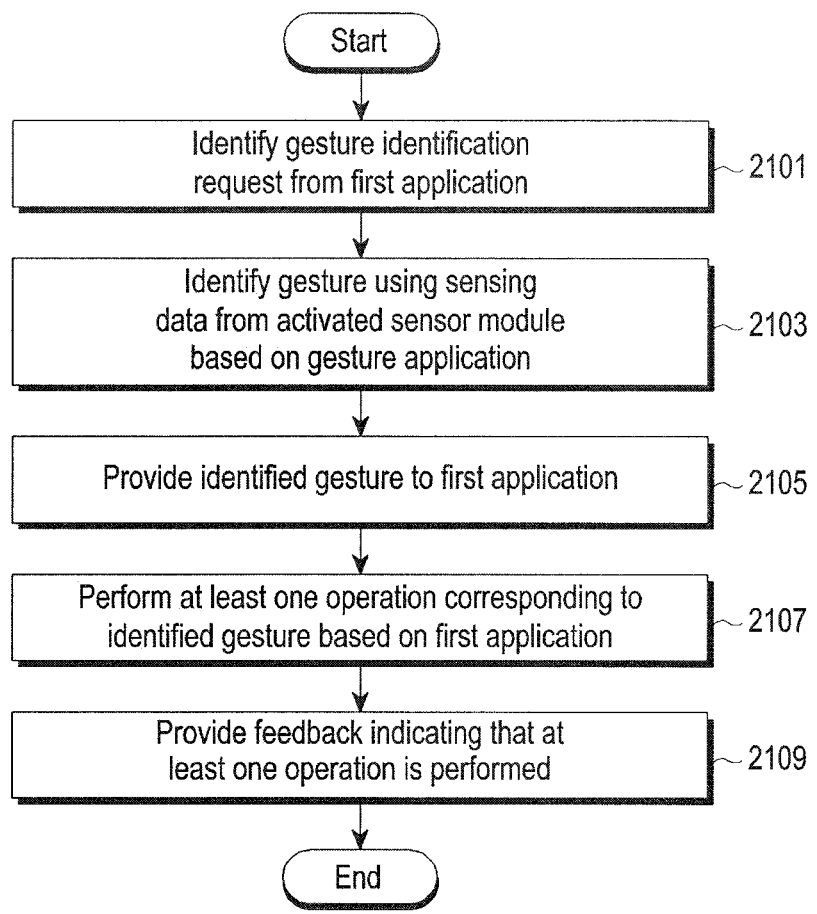
FIG. 21A is a flowchart illustrating a method for operating an electronic device according to an embodiment of the disclosure.
Figure 21B:
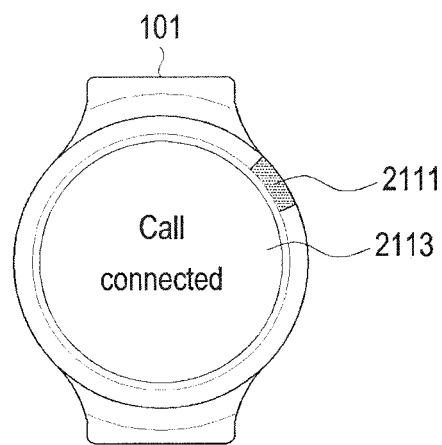
FIG. 21B is a view illustrating an electronic device according to an embodiment of the disclosure.

FIG. 21A is a flowchart illustrating a method for operating an electronic device according to an embodiment of the disclosure. FIG. 21A is described with reference to FIG. 21B. FIG. 21B is a view illustrating an electronic device according to an embodiment of the disclosure.

Referring to FIG. 21A, according to an embodiment, an electronic device 101 (e.g., at least one of the processor 540 of FIG. 5, the processor 710 or the auxiliary processor 720 of FIG. 7, or the processor 810 or the auxiliary processor 820 of FIG. 8) may identify a gesture identification request from a first application in operation 2101. In operation 2103, the electronic device 101 may identify the gesture using the sensing data from the activated sensor module based on the gesture application. In operation 2105, the electronic device 101 may provide the identified gesture to the first application. In operation 2107, the electronic device 101 may perform at least one operation corresponding to the identified gesture based on the first application. In operation 2109, the electronic device 101 may provide a feedback indicating that at least one operation is being performed. For example, referring to FIG. 21B, the electronic device 101 may display an application execution screen 2113 including the text saying, "Call connected." It will be appreciated by those skilled in the art that the application execution screen 2113 is merely an example and that there may further be included information for the caller, information for the call time, and icons for controlling the phone functions. The electronic device 101 may also output a visual feedback 2111. For example, as illustrated in FIG. 21B, the visual feedback 2111 may be output through a light emitting diode (LED) disposed at the outer edge of the display device of the electronic device 101, but embodiments are not limited thereto. Although not shown, the electronic device 101 may output tactile feedback, such as vibration, or audible feedback. For example, the electronic device 101 may output a first vibration pattern when there is an incoming call and output a second vibration pattern when the call is connected. Thus, the user may identify whether the call is connected when the user's unintentional motion is recognized as a gesture to connect the call. In an embodiment, when a photo is taken through a gesture while the camera application is running, the electronic device 101 may output at least one of a visual feedback, such as a pop-up, a tactile feedback, such as vibration, and an audible feedback, such as an alarm.

Figure 22:
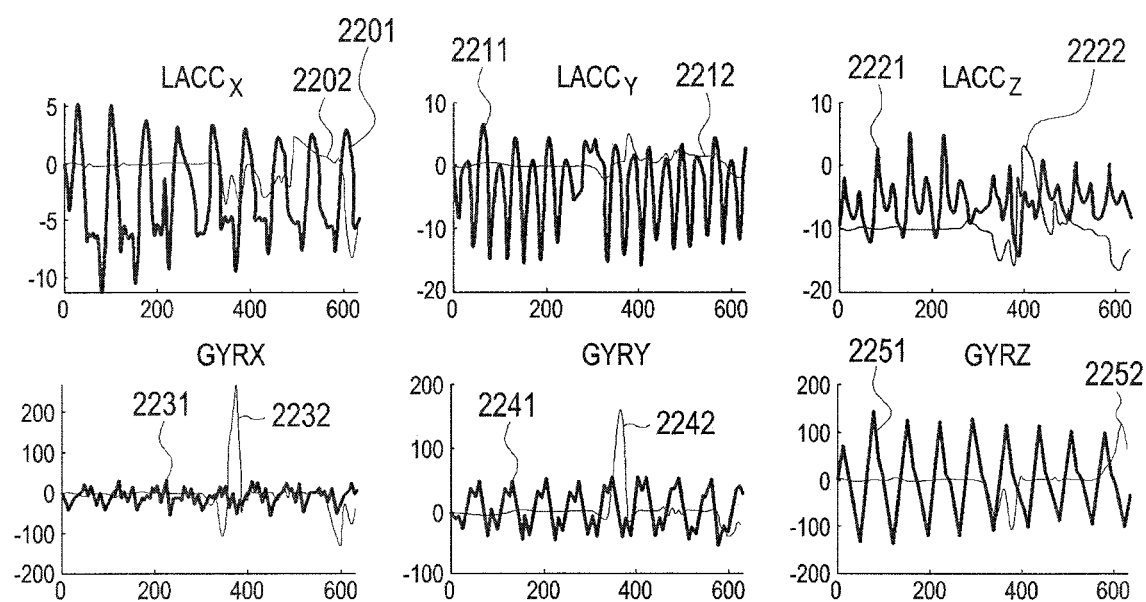
FIG. 22 is a view illustrating measured sensing data according to an embodiment of the disclosure.

FIG. 22 is a view illustrating measured sensing data according to an embodiment of the disclosure.

According to an embodiment, an electronic device 101 (e.g., at least one of the processor 540 of FIG. 5, the processor 710 or the auxiliary processor 720 of FIG. 7, or the processor 810 or the auxiliary processor 820 of FIG. 8) may be implemented to detect periodic motions (e.g., motions from walking or running) and not to perform segment on such periodic motions. Referring to FIG. 22, it illustrates the x-axis linear acceleration LACCx, the y-axis linear acceleration LACCy, the z-axis linear acceleration LACCz, the x-axis gyro acceleration GYRX, the y-axis gyro acceleration GYRY, and z-axis gyro acceleration GYRZ, as measured by the electronic device 101. The LACC sensing data 2201, 2211, and 2221 and the GYRO sensing data 2231, 2241, and 2251 may be sensed in an environment where there is the user's periodic motion (e.g., periodic arm swing, walking, or running) The LACC sensing data 2202, 2212, and 2222 and the GYRO sensing data 2232, 2242, and 2252 may be sensed in an environment in which a specific gesture (e.g., OCO gesture) is made. The sensing data resultant from the user's periodic motion would not be a gesture intended by the user, and accordingly, it may be necessary to prevent segmentation from being performed thereon.

According to an embodiment, the electronic device 101 may identify the periodicity of the sensing data and hold (or ignore) the processing of the sensing data having the periodicity. The electronic device 101 may identify auto-correlation for the sensing data, and identify periodicity based on the auto-correlation. For example, the electronic device 101 may identify an auto-correlation ($R_x(k)$) for N discrete time-series data x sampled based on Equation 2.

$$R_x(k) = \Sigma_{n=0}^{N-1} x(n)x(n-k)$$ Equation 2

In Equation 2, x(n) in the N samples may mean the nth index, and n may be a natural number from 0 to N−1. k may be a variable. The electronic device 101 may obtain values that use k as a variable, using the N pieces of time-series data.

Figure 23:
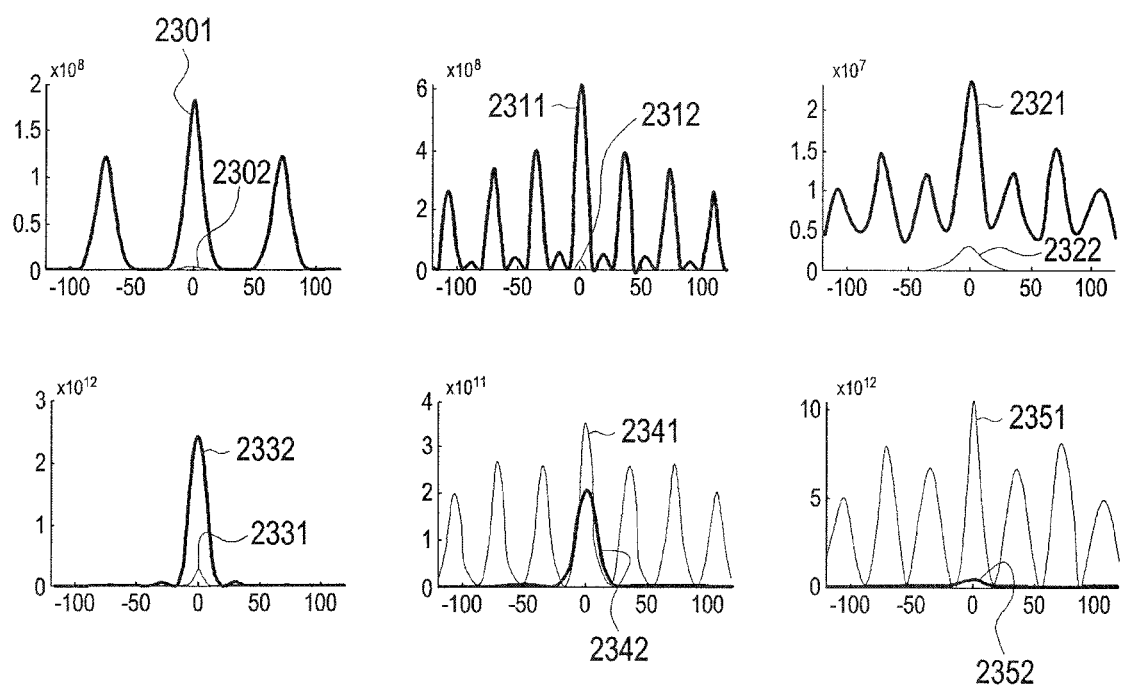
FIG. 23 illustrates graphs using variable k as the x-axis parameter and auto-correlation as the y-axis parameter according to an embodiment of the disclosure.

FIG. 23 illustrates graphs using variable k as the x-axis parameter and auto-correlation as the y-axis parameter, as obtained by the electronic device 101, according to an embodiment of the disclosure. FIG. 23 shows the auto-correlation 2301 for the x-axis linear acceleration, the auto-correlation 2311 for the y-axis linear acceleration, the auto-correlation 2321 for the z-axis linear acceleration, the auto-correlation 2331 for the x-axis gyro acceleration, the auto-correlation 2341 for the y-axis gyro acceleration, and the auto-correlation 2351 for the z-axis gyro acceleration, as measured in an environment in which the user's periodic motion exists. FIG. 23 also shows the auto-correlation 2302 for the x-axis linear acceleration, the auto-correlation 2312 for the y-axis linear acceleration, the auto-correlation 2322 for the z-axis linear acceleration, the auto-correlation 2332 for the x-axis gyro acceleration, the auto-correlation 2342 for the y-axis gyro acceleration, and the auto-correlation 2352 for the z-axis gyro acceleration, as measured when a specific gesture is made. The auto-correlations 2301, 2311, and 2321 associated with the LACC sensing data, and the auto-correlations 2331, 2341, and 2351 associated with the GYRO sensing data may be obtained in an environment where there is the user's periodic motion (e.g., periodic arm swing, walking, or running) The auto-correlations 2202, 2212, and 2322 associated with the LACC sensing data, and the auto-correlations 2232, 2242, and 2352 associated with the GYRO sensing data may be obtained in an environment in which a specific gesture (e.g., OCO gesture) is made. The auto-correlation may have a maximum value when k=0, and the lobe corresponding to when k=0 may be referred to as the main lobe, and the remaining lobes may be referred to as side lobes. In an environment without periodicity, the main lobe of auto-correlation is overwhelmingly larger than that of the side lobes and, in an environment with periodicity, the main lobe of the auto-correlation may be larger than the side lobes, but not overwhelmingly. Accordingly, the electronic device 101 may determine whether periodicity exists in the sensing data based on the size of the main lobe and the size of the side lobe.

Figure 24:
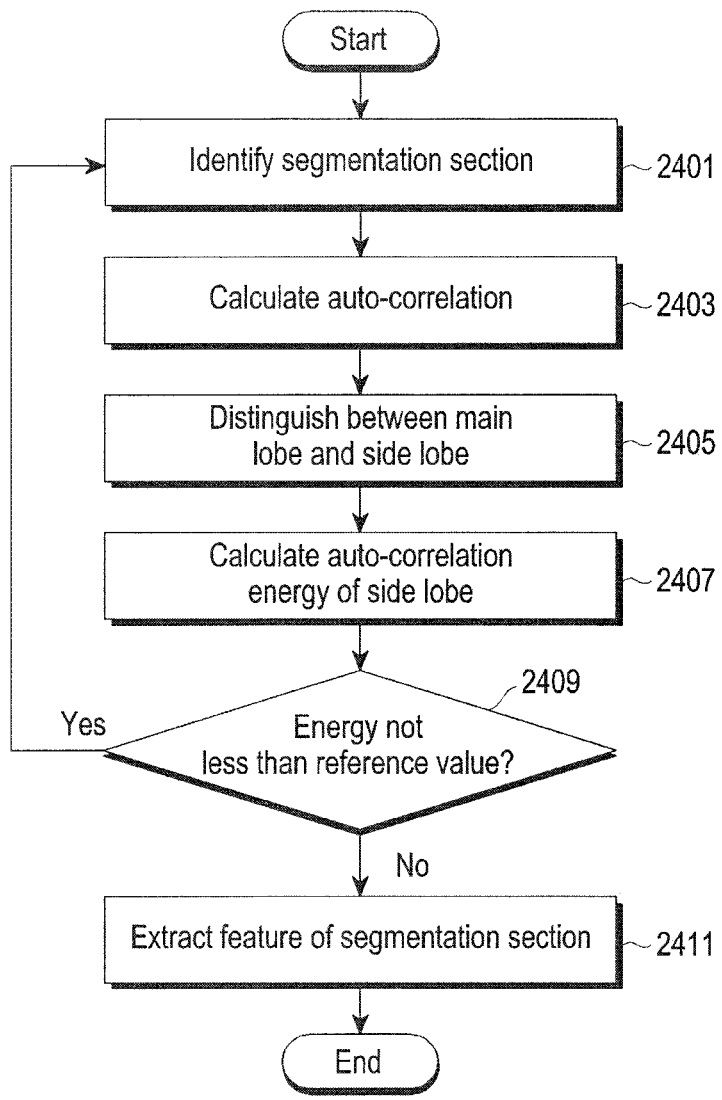
FIG. 24 is a flowchart illustrating a method for operating an electronic device according to an embodiment of the disclosure.

FIG. 24 is a flowchart illustrating a method for operating an electronic device according to an embodiment of the disclosure.

Referring to FIG. 24, an electronic device 101 (e.g., at least one of the processor 540 of FIG. 5, the processor 710 or the auxiliary processor 720 of FIG. 7, or the processor 810 or the auxiliary processor 820 of FIG. 8) may identify a segmentation section in operation 2401. In operation 2403, the electronic device 101 may calculate the auto-correlation for the segmentation section. Accordingly, an auto-correlation with k as a variable, as illustrated in FIG. 23, may be obtained. In operation 2405, the electronic device 101 may distinguish between the main lobe and the side lobes in the auto-correlation. As described above, the auto-correlation may have a maximum value at k=0. The electronic device 101 may identify z, which is the zero crossing point closest to the maximum value. Since auto-correlation is an even function with zero-point symmetry, accuracy may not be affected even when only a section in which k is larger than 0 is considered. The electronic device 101 may calculate the auto-correlation energy of the side lobe in operation 2407. The auto-correlation energy may mean, e.g., the sum of squares of auto-correlations within a specific section. For example, the electronic device 101 may calculate the auto-correlation energy of the side lobe based on Equation 3.

$$E_R = \Sigma_{k=z}^{N-1} R_x(k)^2$$ Equation 3

The electronic device 101 may determine whether energy is not less than a reference value in operation 2409. For example, the electronic device 101 may determine whether the auto-correlation energy of the side lobe calculated according to Equation 3 is not less than threshold energy $E_{th}$. The threshold energy may be set to be able to filter sensing data having periodicity. When the energy is not less than the reference value (yes in 2409), the electronic device 101 may ignore the corresponding segmentation section and identify the next segmentation section. Accordingly, it is possible to prevent processing on segmentation sections having high periodicity. Unless the energy is not less than the reference value (no in 2409), the electronic device 101 may extract a feature of the segmentation section in operation 2411 and may perform gesture recognition based on the extracted feature. Accordingly, only segmentation sections having relatively low periodicity may be processed.

According to an embodiment, an electronic device comprises at least one sensor (e.g., at least one of the sensor module 520 of FIG. 5 or the first sensor module 521 or the second sensor module 523 of FIG. 8) and at least one processor (e.g., at least one of the processor 540 of FIG. 5, the processor 710 or auxiliary processor 720 of FIG. 7, or the processor 810 or auxiliary processor 820 of FIG. 8) configured to identify a gesture identification request from a first application being executed by the at least one processor, in response to the identification of the gesture identification request, identify a gesture using at least one sensing data from at least one first sensor module activated, among the at least one sensor, based on a gesture application, provide the identified gesture to the first application, and perform at least one operation corresponding to the identified gesture based on the first application.

According to an embodiment, the at least one processor may be configured to identify at least one first gesture of a target based on the gesture identification request and activate the at least one first sensor module corresponding to the at least one first gesture.

According to an embodiment, the at least one processor may be configured to, as part of identifying the gesture using the at least one sensing data, generate at least one summation data corresponding to the at least one sensing data based on the at least one sensing data, identify a section of the at least one sensing data as a segmentation section, based on the at least one summation data meeting a designated condition, and perform gesture recognition on the segmentation section.

According to an embodiment, the at least one processor may be configured to, as part of generating the summation data based on the at least one sensing data, generate the at least one summation data corresponding to each of the at least one sensing data by calculating a sum of a designated number of previous sensing data, for each of the at least one sensing data.

According to an embodiment, the at least one processor may be configured to identify that the at least one summation data meets the designated condition based on a ratio of first comparison summation data, among the at least one summation data, to reference summation data, exceeding a designated threshold.

According to an embodiment, the at least one processor may be configured to, in response to second comparison summation data, among the at least one summation data, being larger than summation data immediately before the second comparison summation data, set the second comparison summation data as the reference summation data and start to monitor whether the ratio of the first comparison summation data to the reference summation data exceeds the designated threshold.

According to an embodiment, the at least one processor may be configured to monitor whether third comparison summation data, among the at least one summation data, is larger than summation data immediately before the third comparison summation data in response to the designated threshold by the ratio being not detected within a designated threshold time after starting to monitor whether the ratio of the first comparison summation data to the reference summation data exceeds the designated threshold.

According to an embodiment, the at least one processor may be configured to, as part of identifying the segmentation section, identify a section, from first sensing data corresponding to the first comparison summation data to second sensing data corresponding to an end point after a designated length of time, as the segmentation section.

According to an embodiment, the at least one processor may be configured to, as part of identifying the segmentation section, reset an end point of the identified segmentation section based on whether at least part of the summation data is reduced at the end point of the identified segmentation section.

According to an embodiment, the at least one processor may be configured to, as part of identifying the segmentation section, identify a section, from first sensing data corresponding to the first comparison summation data to second sensing data corresponding to fourth summation data, as the segmentation section, when a ratio of the fourth summation data to the reference summation data is less than a second threshold.

According to an embodiment, the at least one processor may be configured to, as part of identifying the segmentation section, identify the segmentation section in response to identifying that both a first type of summation data corresponding to a first type of sensing data meets the designated condition and a second type of summation data corresponding to a second type of sensing data meets the designated condition, or identify the segmentation section in response to identifying that either the first type of summation data meets the designated condition or the second type of summation data meets the designated condition.

According to an embodiment, the at least one processor may be configured to determine whether to perform the gesture recognition on the segmentation section.

According to an embodiment, the at least one processor may be configured to, as part of determining whether to perform the gesture recognition on the segmentation section, determine whether to perform the gesture recognition on the segmentation section based on different at least one sensing data obtained from the at least one sensor.

According to an embodiment, the at least one processor may be configured to, as part of identifying the segmentation section, identify a first segmentation section and a second segmentation section after the first segmentation section and determine whether to include a portion of the first segmentation section in the second segmentation section.

According to an embodiment, the at least one processor may be configured to, as part of performing the at least one operation corresponding to the identified gesture, perform the at least one operation based on detection of a trigger for performing the at least one operation.

According to an embodiment, the at least one processor may be configured to output at least one feedback indicating that the at least one operation is performed while performing at least one operation corresponding to the identified gesture.

According to an embodiment, the at least one processor may be configured to terminate the gesture application based on the at least one operation being performed.

According to an embodiment, the at least one processor may be configured to, as part of identifying the gesture using the at least one sensing data, identify an auto-correlation corresponding to the at least one sensing data, when the auto-correlation meets a designated condition, identify the gesture for the at least one sensing data, and when the auto-correlation does not meet the designated condition, refrain from identifying the gesture for the at least one sensing data.

According to an embodiment, the at least one processor is configured to, as part of identifying the gesture using the at least one sensing data, determine whether the designated condition is met based on a size of at least one lobe except for a first lobe corresponding to a maximum value of the auto-correlation.

According to an embodiment, a method for operating an electronic device comprises identifying a gesture identification request from a first application being executed by at least one processor of the electronic device, in response to the identification of the gesture identification request, identifying a gesture using at least one sensing data from at least one first sensor module activated, among the at least one sensor of the electronic device, based on a gesture application, providing the identified gesture to the first application, and performing at least one operation corresponding to the identified gesture based on the first application.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
at least one sensor; and
at least one processor configured to:
identify a gesture identification request from a first application being executed by the at least one processor;
in response to the identification of the gesture identification request, identify a gesture using at least one sensing data from at least one first sensor module activated, among the at least one sensor, based on a gesture application;
provide the identified gesture to the first application; and
perform at least one operation corresponding to the identified gesture based on the first application,
wherein, to identify the gesture using the at least one sensing data from the at least one activated first sensor module, the at least one processor is further configured to:
generate at least one summation data corresponding to the at least one sensing data based on the at least one sensing data for a designated length of section,
identify a section of the at least one sensing data as a segmentation section, based on the at least one summation data meeting a designated condition, and
perform gesture recognition on the segmentation section,
wherein the at least one processor is further configured to identify that the at least one summation data meets the designated condition based on a ratio of first comparison summation data, among the at least one summation data, to reference summation data, exceeding a designated threshold.

2. The electronic device of claim 1, wherein the at least one processor is further configured to:
identify at least one first gesture of a target based on the gesture identification request, and
activate the at least one first sensor module corresponding to the at least one first gesture.

3. The electronic device of claim 1, wherein, to generate the at least one summation data corresponding to the at least one sensing data, the at least one processor is configured to generate the at least one summation data corresponding to each of the at least one sensing data by calculating a sum of a designated number of previous sensing data for each of the at least one sensing data.

4. The electronic device of claim 1, wherein the at least one processor is further configured to, in response to second comparison summation data, among the at least one summation data, being larger than summation data immediately before the second comparison summation data, set the second comparison summation data as the reference summation data and start to monitor whether the ratio of the first comparison summation data to the reference summation data exceeds the designated threshold.

5. The electronic device of claim 4, wherein the at least one processor is further configured to monitor whether third comparison summation data, among the at least one summation data, is larger than summation data immediately before the third comparison summation data in response to the designated threshold by the ratio being not detected within a designated threshold time after starting to monitor whether the ratio of the first comparison summation data to the reference summation data exceeds the designated threshold.

6. The electronic device of claim 1, wherein, to identify the segmentation section, the at least one processor is further configured to identify a section, from first sensing data corresponding to the first comparison summation data to second sensing data corresponding to an end point after a designated length of time, as the segmentation section.

7. The electronic device of claim 1, wherein the at least one processor is configured to, as part of identifying the segmentation section, reset an end point of the identified segmentation section based on whether at least part of the summation data is reduced at the end point of the identified segmentation section.

8. The electronic device of claim 1, wherein, to identify the segmentation section, the at least one processor is further configured to identify a section, from first sensing data corresponding to the first comparison summation data to second sensing data corresponding to fourth summation data, as the segmentation section, when a ratio of the fourth summation data to the reference summation data is less than a second threshold.

9. The electronic device of claim 1, wherein, to identify the segmentation section, the at least one processor is further configured to:
identify the segmentation section in response to identifying that both a first type of summation data corresponding to a first type of sensing data meets the designated condition and a second type of summation data corresponding to a second type of sensing data meets the designated condition, or
identify the segmentation section in response to identifying that either the first type of summation data meets the designated condition or the second type of summation data meets the designated condition.

10. The electronic device of claim 1, wherein, to identify the segmentation section, the at least one processor is further configured to:
identify a first segmentation section and a second segmentation section after the first segmentation section; and
determine whether to include a portion of the first segmentation section in the second segmentation section.

11. The electronic device of claim 1, wherein the at least one processor is further configured to, as part of performing the at least one operation corresponding to the identified gesture, perform the at least one operation based on detection of a trigger for performing the at least one operation.

12. The electronic device of claim 1, wherein the at least one processor is further configured to:
receive a signal from the at least one sensor, and
perform pre-processing on the signal received from the at least one sensor before identifying the gesture identification request.

13. The electronic device of claim 12, wherein the pre-processing includes at least one of detrending or up-sampling.

14. The electronic device of claim 12,
wherein the at least one sensor includes a plurality of sensors, and
wherein pre-processing is performed on each signal received from the plurality of sensors.

15. An electronic device, comprising:
at least one sensor; and
at least one processor configured to:
identify a gesture identification request from a first application being executed by the at least one processor, in response to the identification of the gesture identification request, identify a gesture using at least one sensing data from at least one first sensor module activated, among the at least one sensor, based on a gesture application, provide the identified gesture to the first application, and perform at least one operation corresponding to the identified gesture based on the first application, wherein, to identify the gesture using the at least one sensing data from the at least one activated first sensor module, the at least one processor is further configured to:

generate at least one summation data corresponding to the at least one sensing data based on the at least one sensing data for a designated length of section, identify a section of the at least one sensing data as a segmentation section, based on the at least one summation data meeting a designated condition, determine whether to perform gesture recognition on the segmentation section based on different at least one sensing data obtained from the at least one sensor, and perform the gesture recognition on the segmentation section.

\* \* \* \* \*